(12) United States Patent
Higashi et al.

(10) Patent No.: US 7,420,622 B2
(45) Date of Patent: Sep. 2, 2008

(54) IMAGE SWITCHING APPARATUS AND METHOD OF CONTROLLING IMAGE PROCESSING UNIT THEREOF

(75) Inventors: Humiki Higashi, Kanagawa (JP); Nobuyuki Minami, Kanagawa (JP); Glenn Steven Hill, Park Ridge, NJ (US)

(73) Assignee: Sony Corporation, Tokyo (JP)

( * ) Notice: Subject to any disclaimer, the term of this patent is extended or adjusted under 35 U.S.C. 154(b) by 575 days.

(21) Appl. No.: 11/220,043

(22) Filed: Sep. 6, 2005

(65) Prior Publication Data

US 2007/0188663 A1    Aug. 16, 2007

(51) Int. Cl.
*H04N 9/64*    (2006.01)
(52) U.S. Cl. .................. 348/578; 348/705; 348/584; 715/718
(58) Field of Classification Search ............. 348/705, 348/706, 722, 571, 578, 584, 594, 595; 715/716–726
See application file for complete search history.

(56) References Cited

U.S. PATENT DOCUMENTS

| | | | |
|---|---|---|---|
| 4,858,011 A | 8/1989 | Jackson et al. | |
| 5,047,857 A * | 9/1991 | Duffield et al. | 348/553 |
| 5,227,863 A * | 7/1993 | Bilbrey et al. | 348/578 |
| 5,307,456 A * | 4/1994 | MacKay | 715/782 |
| 5,530,434 A | 6/1996 | Kanda | |
| 6,198,477 B1 * | 3/2001 | Kurtze et al. | 715/201 |
| 6,546,188 B1 * | 4/2003 | Ishii et al. | 386/52 |
| 2007/0140666 A1 * | 6/2007 | Higashi et al. | 386/122 |

FOREIGN PATENT DOCUMENTS

JP    2004-153486    5/2004
WO   WO 00 60852    10/2000

OTHER PUBLICATIONS

Grass Valley: "Kalypso User Manual Version 11.0 (071-0618-12)" [Online] Mar. 2005, p. 15-58, 127-134, 285-312, XP002427785.
Yagi N et al: "A Programmable Real-Time Video Signal-Processing System" SMPTE Journal, SMPTE Inc. Scarsdale, N.Y, US, vol. 100, No. 11, Nov. 1, 1991, pp. 860-868, XP000213667 ISSN: 0036-1682.

* cited by examiner

*Primary Examiner*—M. Lee
(74) *Attorney, Agent, or Firm*—Frommer Lawrence & Haug LLP; William S. Frommer

(57) ABSTRACT

A main operation unit (2) is connected to a control unit (4) which controls image processing units (5) to (9), the main control unit (2) includes a setting means for setting the image processing units (5) to (9) to which a sub operation means (3) is connected to the standard mode or the half-divide mode, the control unit (4) controls the image processing units (5) to (9) in response to instruction from the main operation unit (2) upon the standard mode, the control unit (4) controls the image processing units (5) to (9) in response to instruction from the main operation unit (2) upon the half-divided mode and the control unit (4) controls sub circuit blocks (5d) to (5f) within the image processing units (5) to (9) in response to instruction from the sub operation unit (3). Thus, the image switching apparatus can be composed of lesser circuits and such circuits can be used separately without waste as their uses are changed.

13 Claims, 11 Drawing Sheets

FIG. 3A  Wipe
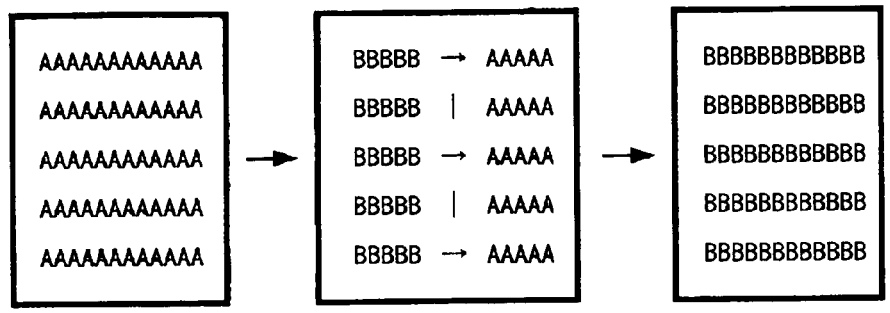
FIG. 3B  Wipe Border
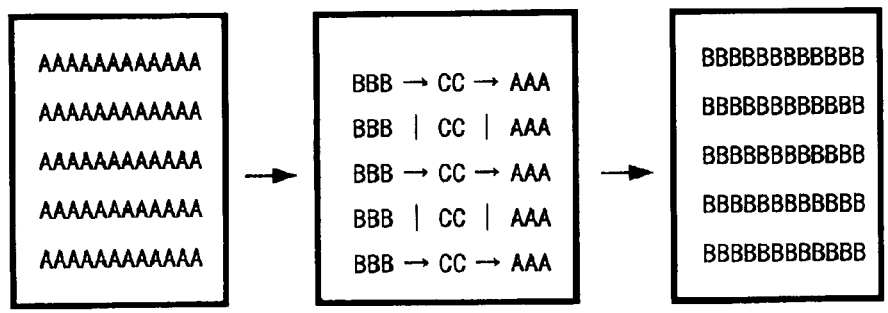
FIG. 3C  DME-Wipe
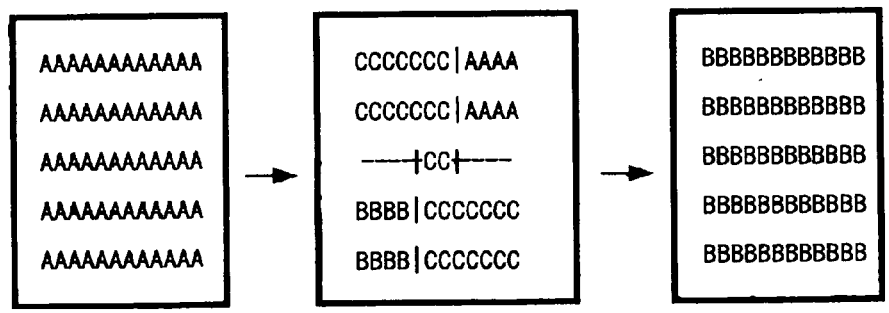

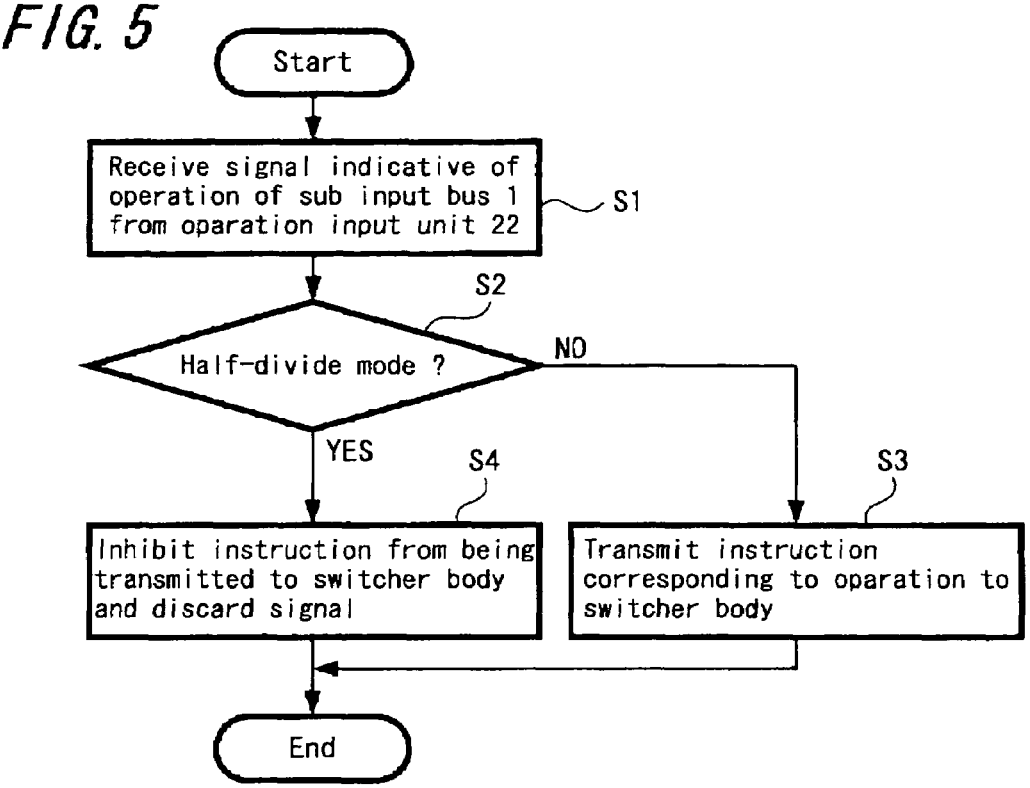
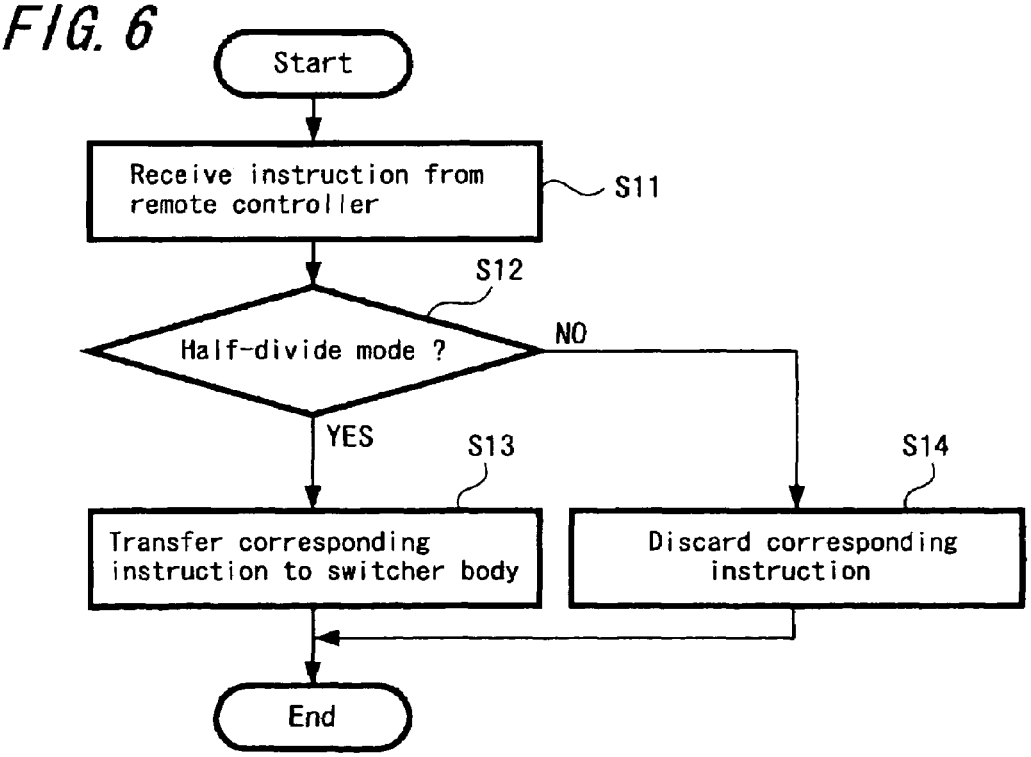

IMAGE SWITCHING APPARATUS AND METHOD OF CONTROLLING IMAGE PROCESSING UNIT THEREOF

BACKGROUND OF THE INVENTION

1. Field of the Invention

The present invention relates to an image switching apparatus capable of switching and outputting a desired video signal from inputted video signals of a plurality of channels and which is also able to perform effects on the video signal upon switching, and particularly to an image switching apparatus in which circuits can be used usefully without waste in response to a variety of purposes.

2. Description of the Related Art

An image switching apparatus (switcher) has hitherto been known as one of professional apparatus for use in editing images in television broadcasting and the like. The image switching apparatus is able to switch and output a desired video signal from inputted video signals of a plurality of channels (video signals from a suitable video source such as a video camera and a VCR (video cassette recorder) and this image switching apparatus is also able to perform effects, such as wipe and mix, on a video signal upon switching. An output video signal from the image switching apparatus is supplied to equipment for transmitting audio-video programs, a video recording and reproducing apparatus, a monitor and the like.

In video edit work, it is customary to carry out various works such as to generate a video signal of only one channel or to generate video signals of a plurality of channels at the same time. Concurrently therewith, it is requested that the image switching apparatus should become available in a variety of purposes.

FIG. 1 of the accompanying drawings is a schematic block diagram showing an example of an arrangement of an image switching apparatus having such function according to the related art. As shown in FIG. 1, this previously-proposed image switching apparatus includes a plurality of image processing portions 51 (51a to 51d) in which an output video signal of one image processing unit 51 is inputted again to other image processing unit 51 as an input video signal. Each image processing unit 51 includes an input selecting unit 52 and a synthesis processing unit 55. The input selecting unit 52 includes a matrix-like selection switch group to connect respective input lines 53a to 53j to input buses 54a to 54c and video signals of one channel each can be selected by the input buses 54a to 54c. A video signal selected by the input selecting unit 52 is supplied to the synthesis processing unit 55, in which it is processed by effects such as wipe and mix and the thus processed video signal is outputted from an output signal output. Also, the above-mentioned thus processed signal from the synthesis processing unit 55 is inputted again to other image processing unit 51 from the input lines 53g to 53j (see Cited Patent Reference 1, for example).

In this image switching apparatus, when the input lines 53g to 53j (output video signals of other image processing units 51) are selected by the input selecting unit 52 of the image processing unit 51, the image processing units 51 are used in the state in which the image processing units 51 of a plurality of stages are connected in series and it becomes possible to generate a video signal of one channel on which effects of a plurality of stages were performed (to output the video signal of one channel from the output terminal output of the image processing unit 51 of the final stage).

Also, the input lines 53g to 53j are not selected by the input selecting unit 52 of the image processing unit 51 so that it becomes possible to generate video signals of a plurality of channels on which effects were performed (to output the video signals of a plurality of channels from the output terminal output of each image processing unit 51).

Cited Patent Reference 1: Official Gazette of Japanese laid-open patent application No. 2004-153486 (paragraph Nos. 0048 to 0054, FIG. 2)

A professional image switching apparatus is very expensive and a cost thereof is considerably increased by only increasing the number of circuits and increasing channels among the circuits. For this reason, it is requested that such image switching apparatus should become available in a variety of purposes and also it is requested that a cost thereof should be decreased by decreasing the number of circuits.

However, in the image switching apparatus described in the above-described Cited Patent Reference 1, when only video signals of channels (for example, one or two channels lesser than the number of the image processing units 51 and on which simple effects were performed are generated, only a part of the image processing units 51 is used and other remaining image processing units 51 are not available in actual practice. As described above, the image processing units 51 which are not available should be provided and hence it is difficult to decrease a cost of such image switching apparatus.

SUMMARY OF THE INVENTION

In view of the aforesaid aspects, the present invention intends to provide an image switching apparatus which can be used in a variety of purposes, the image switching apparatus which can be composed of lesser circuits and in which such circuits can be used separately without use as their uses are changed.

Also, the present invention intends to provide a method of controlling image processing units of such image switching apparatus.

A first image switching apparatus according to the present invention is composed of an image processing unit for switching and outputting a video signal from inputted video signals of a plurality of channels and performing effects on the video signal upon switching, a control unit for controlling this image processing unit, a main operation unit connected to this control unit through a communication channel and which is used to operate this image processing unit and a sub operation unit which can be connected to this main operation unit through a communication channel and which is used to operate this image processing unit, wherein this image processing unit includes a main circuit block exclusively provided in this main operation unit and a sub circuit block for use with this sub operation unit, at least a part of a circuit of this sub circuit block is a common circuit made common to this main operation unit, the image processing unit includes a mode setting means for setting the available mode of this image processing unit to the standard mode or the half-divide mode, this main operation unit does not transfer instruction from this sub operation unit to the control unit upon the standard mode and the main operation unit transfers instruction from this sub operation unit to the control unit upon the half-divide mode, the control unit controls the image processing unit in response to instruction from the main operation unit upon the standard mode, controls the image processing unit in response to instruction from this main operation unit upon the half divide mode and the control units controls the sub circuit block in response to instruction transferred to the sub operation unit by the main operation unit.

Also, in a method of controlling an image processing unit of an image switching apparatus according to the present invention in which the image switching apparatus is composed of an image processing unit for switching and outputting a video signal from inputted video signals of a plurality of channels and performing effects on the video signal upon switching, a control unit for controlling this image processing unit, a main operation unit connected to this control unit through a communication channel and which is used to operate this image processing unit and a sub operation unit which can be connected to this main operation unit through a communication channel and which is used to operate this image processing unit, wherein this image processing unit includes a main circuit block exclusively provided in this main operation unit and a sub circuit block for use with this sub operation unit, at least a part of a circuit of this sub circuit block is a common circuit made common to this main operation unit, this control method is composed of the steps of a step for setting the available mode of the image processing unit to the standard mode or the half-divide mode, a step for inhibiting the main operation unit from transferring instruction from the sub operation unit to the control unit upon the standard mode and allowing the main operation unit to transfer instruction from the sub operation unit to the control unit upon the half-divide mode and a step for allowing the control unit to control the image processing unit in response to instruction from the main operation unit upon the standard mode, allowing the control unit to control the image processing unit in response to instruction from the main operation unit upon the half-divide mode and allowing the control unit to control the sub circuit block in response to instruction transferred to the sub operation unit by the main operation unit.

According to the present invention, the image switching apparatus includes the two operation units of the main operation unit connected to the control unit for controlling the image processing unit through the communication channel and the sub operation unit which can be connected to the main operation unit through the communication channel.

The image processing unit includes the main circuit block exclusively provided in the main operation unit and the sub circuit block for use with the sub operation unit and at least a part of the circuit of the sub circuit block is the common circuit which is made common to the main operation unit.

The available mode of this image processing unit is set to either the standard mode or the half-divide mode. Upon the standard mode, the main operation unit transfers the instruction generated by the operation of the main operation unit to the control unit but the main operation unit does not transfer instruction from the sub operation unit to the control unit. Then, the control unit controls the image processing unit in response to instruction from this main operation unit. Thus, the main operation unit energizes the main circuit block and the common circuit to generate a video signal of one channel (to generate a video signal of one channel from the image processing unit).

On the other hand, upon the half-divide mode, the main operation unit transmits instruction generated by operation of the main operation unit to the control unit and the main operation unit transfers instruction generated from the sub operation unit when the sub operation unit is operated to the control unit. Then, the control unit controls the image processing unit in response to instruction from the main operation unit and it also controls the sub circuit block in response to instruction from the sub operation unit. As a result, at the same time the main operation unit energizes the main circuit block to generate a video signal of one channel (to generate a video signal of one channel from the image processing unit), the sub operation unit can energize the sub circuit block to generate another video signal of one channel (to generate another video signal of one channel from the image processing unit simultaneously) simultaneously.

As described above, the circuit within one image processing unit within the same image switching apparatus (the common circuit in the sub circuit block) can be commonly used to generate the video signal of one channel only by the main operation unit and to generate video signals of two channels in total by the main operation unit and the sub operation unit, respectively.

As a consequence, not only the image switching apparatus can be used in a variety of uses but also the image switching apparatus can be composed of lesser circuits and such circuits can be used separately without waste as their uses are changed.

Next, a second image switching apparatus according to the present invention is composed of an image processing unit for switching and outputting a video signal from inputted video signals of a plurality of channels and performing effects on the video signal upon switching, a control unit for controlling the image processing unit and an operation unit connected to the control unit through a communication channel and which is used to operate the image processing unit, wherein the image processing unit includes a main circuit block exclusively provided in this operation unit and a sub circuit block provided independently of the main circuit block, at least a part of the circuit of this sub circuit block is a common circuit made common to this operation unit, the image processing unit includes a mode setting means for setting the available mode of the image processing unit to the standard mode to the half-divide mode and the operation unit does not transmit instruction to energize this common circuit to the control unit when operation to energize the common circuit is made upon the half-divide mode.

In this image switching apparatus, the sub operation unit is removed from the aforementioned first image switching apparatus of the present invention and there is provided only one operation unit which corresponds to the main operation unit.

In this image switching apparatus, the operation unit does not transmit instruction to energize the common circuit to the control unit when operation to energize the common circuit is made in this half-divide mode. Accordingly, upon the half-divide mode, the common circuit is not driven by operations of this operation unit.

Thus, when another operating apparatus is newly connected to the image switching apparatus and the image switching apparatus is used in the half-divide mode, it is possible to prevent the common circuit from mal-functioning by operations of the operation unit.

Next, a third image switching apparatus according to the present invention is composed of an image processing unit for switching and outputting a video signal from inputted video signals of a plurality of channels and performing effects on the video signal upon switching, a control circuit for controlling the image processing unit and an operation unit connected to the control unit through a communication channel and which is used to operate this image processing unit, wherein this image processing unit includes an input selecting unit for selecting each video signal from inputted video signals of a plurality of channel by a plurality of input buses, an image synthesizing unit for performing effects on the video signal selected by this input selecting unit and an internal signal generator for generating a video signal in the inside of the image processing unit, the input selecting unit includes more than two main input buses exclusively provided in this operation unit and more than two sub input buses provided independently of the main input bus, at least more than one input bus of the sub input buses is a common input bus made common to the operation unit, the image synthesizing unit has a function to interpose a third video signal between the present video signal and the next video signal when effects are performed on the video signal, the image processing unit includes a mode setting means for setting the available mode of the image processing unit to either the standard mode or the half-divide mode and the control unit supplies any one of the video signal selected by this common input bus and the video signal from the internal signal generator to the image synthesizing unit as the third video signal in response to instruction from this operation unit upon the standard mode and it also supplies only the video signal from this internal signal generator to the image synthesizing unit as the third video signal upon the half-divide mode.

In this image switching apparatus, when another third video signal is interposed between the present video signal and the next video signal to perform effects, upon the standard mode, any one of the video signal from the common input bus (common circuit) and the video signal generated from the inside of the image processing unit can be selected by the operation unit and can be used as the third video signal. However, upon the half-divide mode, only the video signal generated within the image processing unit can be used as the third video signal.

As a result, when another operation apparatus is newly connected to the image switching apparatus and the image switching apparatus is used in the half-divide mode, it is possible to prevent an operator to operate the operation unit from using an unintended video signal (video signal selected by another operator who operates another operation apparatus) as the third video signal.

Next, a fourth image switching apparatus according to the present invention is composed of an image processing unit for selecting and outputting a video signal from inputted video signals of a plurality of channels and which is used to perform effects on the video signal upon switching, a control unit for controlling this image processing unit and an operation unit connected to the control unit through a communication channel and which is used to operate this image processing unit, wherein this image processing unit includes a main circuit block exclusively provided in this operation unit and a sub circuit block provided independently of this main circuit block, at least a part of the circuit of this sub circuit block is a common circuit made common to the operation unit, the image processing unit includes a mode setting means for setting the available mode of the image processing unit to either the standard mode or the half-divide mode, the control unit stores therein setting state information indicative of the setting state in which the image processing unit was set at the past time point, the operation unit includes operation means to recall the image processing unit to the setting state in which the image processing unit was set at the past time point and the control circuit recalls only the setting state of the main circuit block to the setting state of the past time point based on this setting state information in response to instruction supplied to the operation unit when the operation means is operated upon the half-divide mode.

In this image switching apparatus, when the image processing unit is recalled to the setting state at the past time point by the operation means of the operation unit, upon the half-divide mode, since only the setting state of the main circuit block is recalled but the setting state of the sub circuit block is not recalled, the sub circuit block is maintained in the present setting state.

As a consequence, when another operation apparatus is newly connected to the image switching apparatus and the image switching apparatus is used in the half-divide mode, it is possible to prevent the setting state of the sub circuit block from being recalled against the intention of the operator who operates another operation apparatus.

Next, a fifth image switching apparatus according to the present invention is composed of an image processing unit for switching and outputting a video signal from inputted video signals of a plurality of channels and performing effects on the video signal upon switching, a control unit for controlling this image processing unit and an operation unit connected to the control unit through a communication channel and which is used to operate this image processing unit, wherein this image processing unit includes an input selecting unit for selecting each video signal from the inputted video signals of a plurality of channels by a plurality of input buses, an image synthesizing unit for performing effects on the video signal selected by the input selecting unit and a synthesis selecting unit for selecting the video signals selected by the input selecting unit so that any of the video signals is supplied to the image synthesizing unit as the present video signal and the next video signal, this input selecting unit includes more than two main input buses exclusively provided in the operation unit and more than two sub input buses provided independently of the main input buses, at least more than one input bus of the sub input buses is a common input bus made common to the operation unit, this image synthesizing unit includes a main image synthesizing unit for performing effects on the video signal selected by this main input bus and the common input bus and a sub image synthesizing unit for performing effects on the video signal selected by this sub input bus, the image processing unit includes a mode setting means for setting the available mode of the image processing unit to either the standard mode or the half-divide mode, the control unit has a function to select by controlling either of the main input bus and the synthesis selecting unit whether or not processing for switching the present video signal and the next video signal is executed when the present video signal is completely replaced with the next video signal by the main image synthesizing unit and a function to select by controlling either of the sub input bus and the synthesis selecting unit whether or not processing for switching the present video signal and the next vide signal is executed when the present video signal is completely replaced with the next video signal by the sub image synthesizing unit, the operation unit includes an operation means for selecting whether processing for switching the present video signal and the next video signal is executed by the input selecting unit or the synthesis selecting unit when the present video signal is completely replaced with the next video signal by the image synthesizing unit and the control unit allows either the input selecting unit to control only the main input bus or the synthesis selecting unit to select only the video signal supplied to the main image synthesizing unit in response to instruction supplied from the operation unit when the operation means is operated.

When effects are performed on the video signal by the image processing unit and the present video signal is completely replaced with the next video signal, this time, the present video signal and the next video signal are switched in such a manner that the next video signal which has been replaced may be replaced with the new present video signal. As a method for switching the present video signal and the next video signal, there are two methods of a method for switching the selection of the input bus to select the present video signal and the input bus to select the next video signal by the input selecting unit which selects the input video signal in the opposite manner and a method for switching the selection of the line for supplying the present video signal to the image synthesizing unit and the line for selecting the next video signal by the synthesis selecting unit for selecting and supplying the output video signal from this input selecting unit to the image synthesizing unit in the opposite manner. According to the former method, the same input bus of the input selecting unit constantly becomes the input bus which selects the present video signal. According to the latter method, input buses which select the present video signal in the input selecting unit are switched alternately.

In this image switching apparatus, when the former method is selected by the operation means of the operation unit, selection is switched by only the main input bus in the input selecting unit and selection is not switched by the sub input bus.

Thus, when another operation apparatus is connected to the image switching apparatus and the image switching apparatus is used in the half-divide mode, since it is possible to prevent another operator, who operates another operation apparatus, from becoming unable to understand which input bus of the sub input bus selects the present video signal, it is possible to improve operability of another operation apparatus.

According to the first image switching apparatus of the present invention and the method of controlling the image processing unit of the image switching apparatus of the present invention, not only the image switching apparatus can be used in a variety of purposes but also the image switching apparatus can be composed of lesser circuits and such circuits can be separately used without waste as their uses are changed.

According to the second image switching apparatus of the present invention, when another operation apparatus is newly connected to the image switching apparatus, effects similar to those of the first image switching apparatus can be achieved. Further, there can be achieved the effect in which the common circuit can be prevented from mal-functioning in the half-divide mode.

According to the third switching apparatus of the present invention, when another operation apparatus is newly connected to the image switching apparatus, effects similar to those of the first image switching apparatus can be achieved. Further, when wipe effect in which another third video signal is interposed between the present video signal and the next video signal is performed on the video signal, there can be achieved the effect in which the video signal which the operator does not intend to generate can be prevented from being used as the third video signal.

According to the fourth image switching apparatus of the present invention, when another operation apparatus is newly connected to the image switching apparatus, effects similar to those of the first image switching apparatus can be achieved. Further, there can be achieved the effect in which the sub circuit block can be prevented from being recalled to the setting state of the past time point against the intention of the operator who operates another operation apparatus.

According to the fifth image switching apparatus of the present invention, when another operation apparatus is newly connected to the image switching apparatus, effects similar to those of the first image switching apparatus can be achieved. Further, it is possible to prevent the operator operating another operation apparatus from becoming unable to understand which input bus of the sub input buses selects the present video signal and hence there can be achieved the effect in which operability of another operation apparatus can be improved.

BRIEF DESCRIPTION OF THE DRAWINGS

FIGS. 3A, 3B and 3C are schematic diagrams showing specific examples of effects performed on images by a main image synthesizing unit and a sub image synthesizing unit, respectively;

FIG. 5 is a flowchart to which reference will be made in explaining processing executed by a control unit within the control panel when a sub input bus 1 is operated;

FIG. 6 is a flowchart to which reference will be made in explaining processing executed by the control unit within the control panel when the control unit receives instruction from a remote controller;

DESCRIPTION OF THE PREFERRED EMBODIMENTS

The present invention will hereinafter be described in concrete with reference to the drawings.

Figure 1:
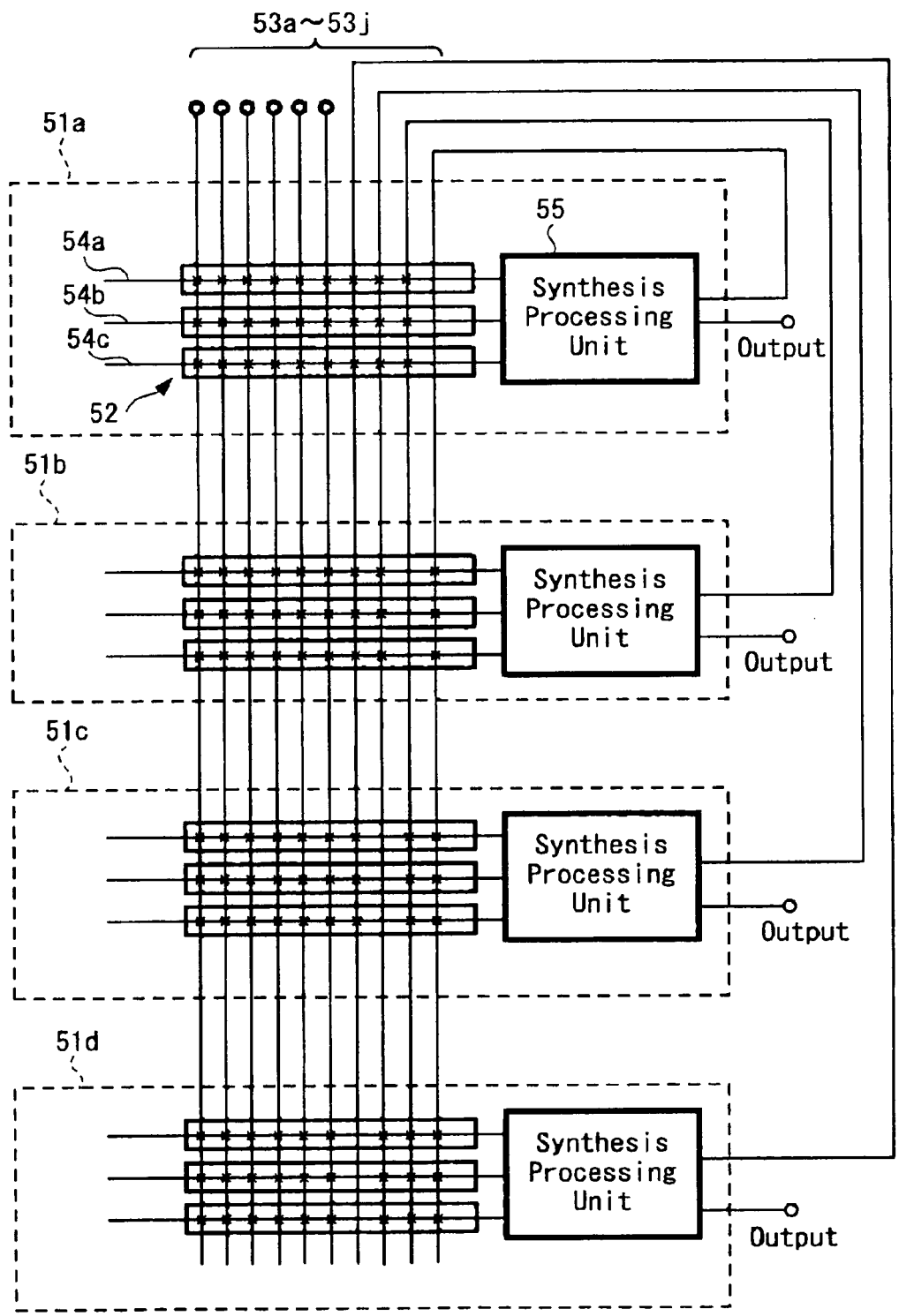
FIG. 1 is a schematic block diagram showing an example of an arrangement of an image switching apparatus according to the related art.
Figure 2:
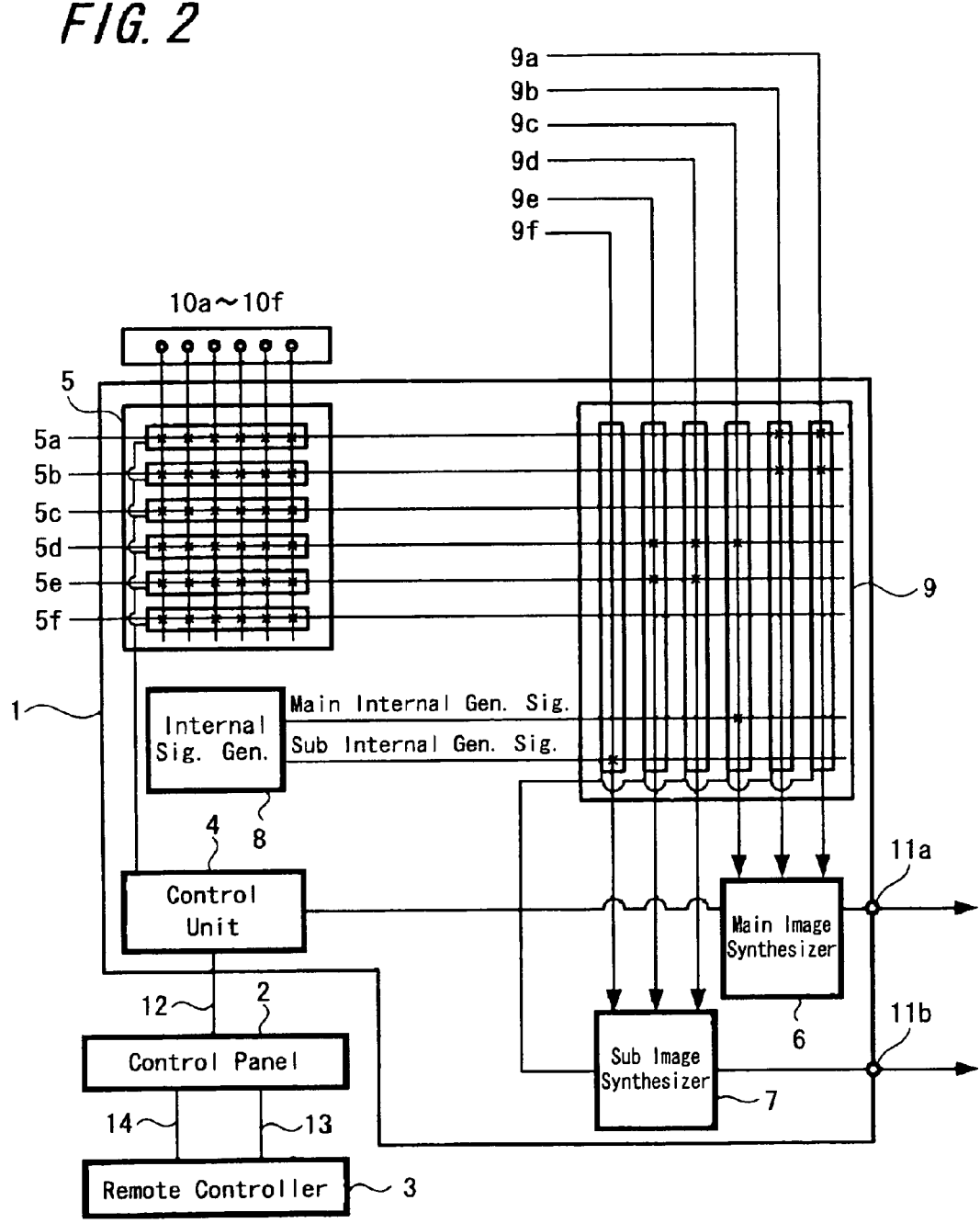
FIG. 2 is a schematic block diagram showing an overall arrangement of an image switching apparatus according to the present invention.

FIG. 2 is a schematic block diagram showing an overall arrangement of an image switching apparatus (switcher) according to the present invention. As shown in FIG. 2, this image switching apparatus is composed of a switcher body 1, a control panel 2 and a remote controller 3.

The switcher body 1 and the control panel 2 are connected through a communication channel 12 such as a network (LAN (local area network)).

The control panel 2 includes GPI (General Purpose Interface) connector for parallel input and output and a serial communication standard connector, and the remote controller 3 also includes the above two connectors. The control panel 2 and the remote controller 3 are connected through a communication channel 13 by using the former connector (GPI) and they are connected through a communication channel 14 by using the latter connector.

The control panel 2 is an operation unit which is used by an operator to operate the switcher body 1 near the switcher body 1 (when the switcher body 1 is installed in a television broadcast relay vehicle, for example, the operator operates the operation unit within the television broadcast relay vehicle) and this control panel 2 corresponds to a main operation unit in the claim 1.

The remote controller 3 is an operation unit which is used by an operator different from the operator of the control panel 2 to operate the switcher body 1 (when the switcher body 1 is installed within the television broadcast relay vehicle, for example, the operator operates this operation unit outside the television broadcast relay vehicle) and this remote controller 3 corresponds to a sub operation unit in the claims. When the operator operates the switcher body 1 by using only the control panel 2, the remote controller 3 can be removed from this image switching apparatus by extracting the connectors from the communication channels 13 and 14.

Within the switcher body 1, there are provided a control unit 4, an input selecting unit 5, a main image synthesizing unit 6, a sub image synthesizing unit 7, an internal signal generator 8 and a synthesis selecting unit 9. The control panel 2 is connected to the control unit 4.

Video signals of a plurality of channels (video signals from a suitable video source such as a video camera and a VCR (video cassette recorder)) are inputted to the switcher body 1 from input lines 10a to 10f. The input selecting unit 5 includes a matrix-like selection switch group to connect the respective input lines 10a to 10f to any input buses 5a to 5f. Video signals of one channel each can be selected by the input buses 5a to 5f.

The input buses 5a, 5b and 5c in the input selecting unit 5 are main input buses (main input bus 1, main input bus 2 and auxiliary main input bus) exclusively provided for the control panel 2.

The input buses 5d, 5e and 5f in the input selecting unit 5 are sub input buses (sub input bus 1, sub input bus 2 and auxiliary sub input bus) which are used by the remote controller 3. The input bus 5 (sub input bus 1) is a common input bus which is made common to the control panel 2.

The main image synthesizing unit 6 and the sub image synthesizing unit 7 are adapted to perform effects such as wipe and mix on video signals supplied from the synthesis selecting unit 9 as will be described later on. FIGS. 3A to 3C show specific examples of effects performed on the video signals.

FIG. 3A shows an example of effect called "wipe". "Wipe" is processing in which a picture to be displayed on the screen is gradually replaced with the next video signal (shown by a set of characters "B") from the state in which only the present video signal (shown by a set of characters "A") is displayed as in the left end picture and in which the present video signal is all replaced with the next video signal finally as in the right end picture.

FIG. 3B shows an example of effect called "wipe border". "Wipe border" is processing in which when wipe shown in FIG. 3A is performed on the video signal, another third video signal (shown by a set of characters "C") is interposed between the present video signal (shown by a set of characters "A") and the next video signal (shown by a set of characters "B") as in the center picture. This third video signal is called a "wipe border fill".

FIG. 3C shows an example of effect called "DME (digital multi-effects)-wipe". "DME-wipe" is processing in which the present video signal and the next video signal are moved within the picture and thereby replaced with each other. In the example shown in FIG. 3C, from the state in which only the present video signal (shown by a set of characters "A") is displayed as in the left end picture, at the same time the next video signal (shown by a set of characters "B") is generated from lower left of the picture and moved in the upper right direction as in the center picture, the present video signal is moved in the upper right direction and move to the outside of the picture and thereby the present video signal is all replaced with the next video signal finally as in the right end picture. Another third video signal (shown by a set of characters "C") is interposed between the present video signal and the next video signal. This third video signal is called a "background signal".

The video signals on which effects were performed by the main image synthesizing unit 6 and the sub image synthesizing unit 7 are outputted from output terminals 11a and 11b to the outside of the switcher body 1. An output video signal from the switcher body 1 is transmitted to program transmission equipment, a video recording apparatus, a monitor and the like.

The internal signal generator 8 is a circuit which generates two channels (generate video signals as a main internal generated signal and a sub internal generated signal) of video signals of single color such as blue and red or video signals of mixed color of two colors within the switcher body 1.

The synthesis selecting unit 9 includes six output lines of a main present output signal line 9a, a main next output signal line 9b, a main complementary signal line 9c, a sub present output signal line 9d, a sub next output signal line 9e and a sub complementary signal line 9f.

The main present output signal line 9a is a line which is used to supply the present video signal shown in FIGS. 3A to 3C to the main image synthesizing unit 6. The main next output signal line 9b is a line which is used to supply the next video signal shown in FIGS. 3A to 3C to the main image synthesizing unit 6. The main complementary signal line 9c is a line which is used to supply the wipe border fill shown in FIG. 3B and the background signal shown in FIG. 3C to the main image synthesizing unit 6.

The sub present output signal line 9d is a line which is used to supply the present video signal to the sub image synthesizing unit 7. The sub next output signal line 9e is a line which is used to supply the next video signal to the sub image synthesizing unit 7. The sub complementary signal line 9f is a line which is used to supply the wipe border and the background signal to the sub image synthesizing unit 7.

The main present output signal line 9a and the main next output signal line 9b include selection switches to select any of the video signal from the input bus 5a (main input bus 1) of the input selecting unit 5 or the video signal from the input bus 5b (main input bus 2).

The main complementary signal line 9c includes a selection switch to select any of the video signal from the input bus 5d (sub input bus 1 serving as the common input bus) of the input selecting unit 5 and the main internal generated signal from the internal signal generator 8.

The sub present output signal line 9d and the sub next output signal line 9e include selection switches to select any of the video signal from the input bus 5d (sub input bus 1) of the input selecting unit 5 and the video signal from the input bus 5e (sub input bus 2).

The sub complementary signal line 9f includes a selection switch to select only the sub internal generated signal from the internal signal generator 8.

The input selecting unit 5, the main image synthesizing unit 6, the sub image synthesizing unit 7, the internal signal generator 8 and the synthesis selecting unit 9 correspond to the image processing units in the claims. The control unit 4 is a microcomputer to control these respective units and which corresponds to the control unit in the claims.

Figure 4:
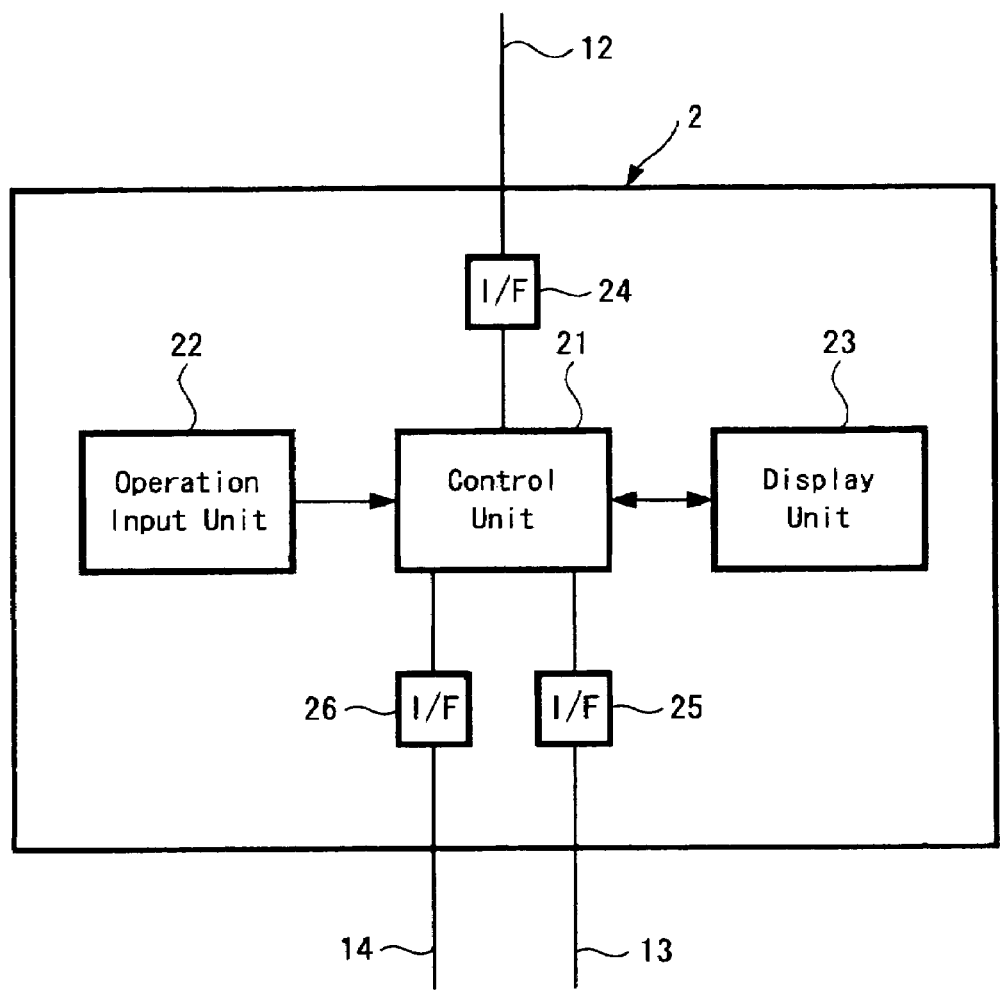
FIG. 4 is a schematic block diagram showing an outline of an arrangement of a control panel.

FIG. 4 is a schematic block diagram showing an outline of an arrangement of the control panel 2. The control panel 2 includes a control unit 21, an operation input unit 22, a display unit 23 and communication interfaces 24 to 26 corresponding to the respective communication channels 12 to 14 shown in FIG. 2.

The operation input unit 22 includes various operation means to set and operate the switcher body 1 shown in FIG. 2. The following ones are contained in such various operation means.

(1): Operation buttons to select video signals of the input buses 5a, 5b, 5d (main input bus 1, main input bus 2 and sub input bus 1 serving as the common input bus) of the input selecting unit 5;

(2): Operation buttons to select the kind of effects in the main image synthesizing unit 6;

(3): Fader lever to manually adjust a ratio in which the present video signal and the next video signal are synthesized when effects are performed on the video signal by the main image synthesizing unit 6 or to manually adjust a speed at which such ratio is changed;

(4): "Available mode setting button" to set the available mode of the switcher body 1 to any of the standard mode or the half-divide mode;

(5): "Store button" to store the present setting state of the switcher body 1 (to select a video signal of which input line by the input selecting unit 5, to select the kind of effect performed on the video signal in the main image synthesizing unit 5 and the like);

(6): "Recall button" to recall the setting state of the switcher body 1 to the setting state of a desired past time point stored by the "store button" (this recall is called a "snapshot"); and (7): "Bus toggle setting button" to set the bus toggle operation mode, which will be described later on, to any of ON and OFF.

The display unit 23 is composed of a liquid-crystal display, for example, to display thereon information necessary to operate the image switching apparatus and the operation state of the image switching apparatus.

The control unit 21 is composed of a microcomputer to transmit instruction corresponding to the operation contents of the operation input unit 22 through the communication channel 12 to the control unit 4 within the switcher body 1 (when operation for operating the input bus 5d (sub input bus 1 serving as the common input bus) of the input selecting unit 5 is carried out, processing, which will be described with reference to FIG. 5, is executed).

Also, the control unit 21 controls operation contents of the operation input unit 22 and display contents of the display unit 23 in response to information and the like received from the control unit 4 within the switcher body 1. Further, the control unit 21 executes processing, which will be described later on with reference to FIG. 6, when it receives trigger and instruction from the remote controller 3 through the communication channels 13 and 14.

Although not show, the remote controller 3 also includes a control unit composed of a microcomputer and an operation input unit that includes the following operation means.

(1): Operation buttons to select video signals from the input buses 5d, 5e (sub input bus 1 and sub input bus 2) of the input selecting unit 5 within the switcher body 1;

(2): Operation buttons to select the kind of effect performed on the video signal by the sub image synthesizing unit 7 within the switcher body 1;

(3): Fader lever to manually adjust a ratio in which the present video signal and the next video signal are synthesized when effects are performed on the video signal by the sub image synthesizing unit 7 or to manually adjust a speed at which the above ratio is changed; and (4): "Bus toggle setting button" to set the bus toggle operation mode, which will be described later on, to any of ON and OFF.

The control unit within the remote controller 7 transmits trigger to operate the sub image synthesizing unit 7 through the communication channel 13 to the control unit 21 within the control panel 2 as a GPI signal based on the operations of these operation input units and also transmits other instruction through the communication channel 14 to the control unit 21.

Next, processing executed by the control unit 21 within the control panel 2 in association with the available mode set by the "available mode setting button" of the operation input unit 22 of the control panel 2 will be described with reference to FIGS. 5 and 6.

When the setting of the available mode is changed from the standard mode to the half-divide mode by the "available mode setting button", the control unit 21 within the control panel 2 transmits half-divide mode transition instruction through the communication channel 12 to the control unit 4 within the switcher body 1. When on the other hand the setting of the available mode is changed from the half-divide mode to the standard mode by the "available mode setting button", the control unit 21 within the control panel 2 transmits half-divide mode cancel instruction through the communication channel 12 to the control unit 4.

Also, the control unit 21 executes processing shown in FIG. 5 when an operation to operate the input bus 5d (sub input bus 1 serving as the common input bus) of the input selecting unit 5 is made by the operation input unit 22. Referring to FIG. 5 and following the start of operation, when the control unit 21 receives a signal indicative of the operation to operate the sub input bus 1 from the operation input unit 22 at a step S1, then control goes to the next decision step S2, whereat it is determined whether the present mode set by the "available mode setting mode" is the half-divide mode".

If a NO is outputted at the decision step S2 (if the present mode is the standard mode), then control goes to a step S3, whereat the control unit 21 transmits instruction to operate the sub input bus 1 through the communication channel 12 to the control unit 4 within the switcher body 1 in response to the corresponding operation. Then, control is ended. If on the other hand a YES is outputted at the decision step S2, then control goes to a step S4, whereat the control unit 21 does not transmit instruction to the control unit 4 but it discards the signal supplied from the operation input unit 4. Then, control is ended.

Also, the control unit 21 executes processing shown in FIG. 6 when it receives trigger and instruction (hereinafter simply referred to as "instruction") from the remote controller 3 through the communication channels 13 and 14. Referring to FIG. 6 and following the start of operation, when the control unit 21 receives instruction from the remote controller 3 at a step S11, then control goes to the next decision step S12, whereat it is determined whether the present mode set by the "available mode setting button" is the half-divide mode.

If a YES is outputted at the decision step S12, control goes to a step S13, whereat instruction received from the remote controller 3 can be distinguished as instruction (not the instruction generated by the operation of the operation input unit 22 of the control panel 2) generated by the operation of the remote controller 3 and such instruction is transferred through the communication channel 12 to the control unit 4 within the switcher body 1. Then, control is ended. If on the other hand a NO is outputted at the decision step S12 (if the present mode is the standard mode), then control goes to a step S14, whereat the instruction received from the remote controller 3 is not transferred to the control unit 4 within the switcher body 1 and it is discarded. Then, control is ended.

Next, processing executed by the control unit 4 within the switcher body 1 in association with the available mode set by the "available mode setting button" of the operation input unit 22 of the control panel 2 will be described with reference to FIGS. 7 to 11.

Figure 7:
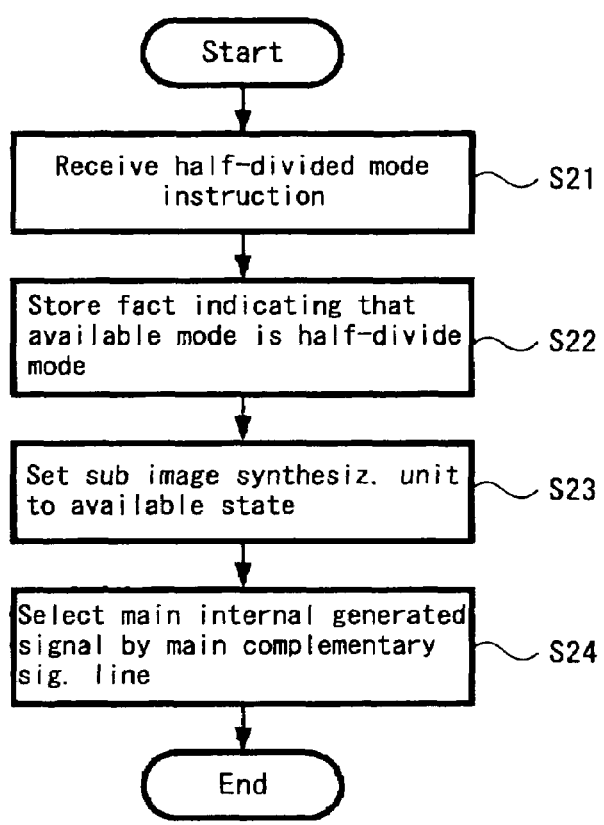
FIG. 7 is a flowchart to which reference will be made in explaining processing executed by a control unit within a switcher body when the control unit receives half-divide mode transition instruction.

FIG. 7 is a flowchart to which reference will be made in explaining processing executed by the control unit 4 within the switcher body 1 when it receives the aforementioned half-divide mode transition instruction from the control unit 21 within the control panel 2. Referring to FIG. 7 and following the start of operation, when the control unit 21 receives the half-divide mode transition instruction at a step S21, then control goes to a step S21, whereat the control unit 21 stores data indicating that the present available mode is the half-divide mode in its internal memory. Subsequently, control goes to a step S23, whereat the sub image synthesizing unit 7 is set to the available mode and control goes to a step S24. In the step S24, the main internal generated signal from the internal signal generator 8 is selected by the main complementary signal line 9c of the synthesis selecting unit 9.

Figure 8:
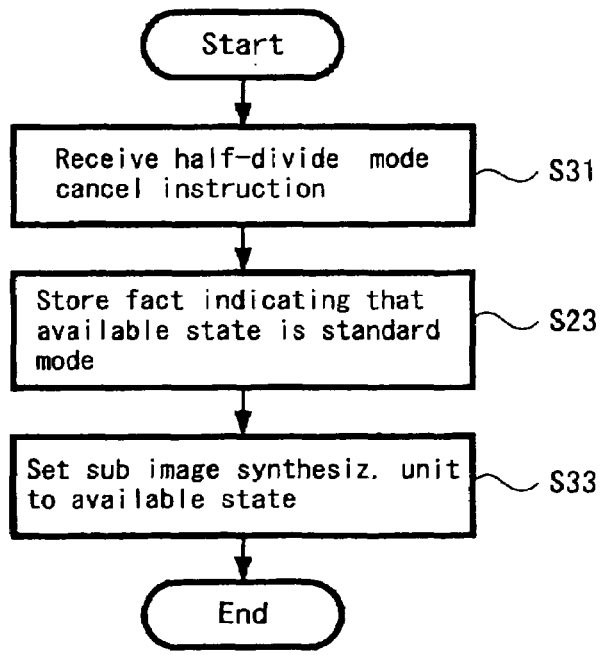
FIG. 8 is a flowchart to which reference will be made in explaining processing executed by the control unit within the switcher body when the control unit receives half-divide mode cancel instruction.

FIG. 8 is a flowchart to which reference will be made in explaining processing executed by the control unit 4 within the switcher body 1 when it receives the aforementioned half-divide cancel instruction from the control unit 21 within the control panel 2. Referring to FIG. 8 and following the start of operation, when the control unit 4 receives the half-divide mode cancel instruction from the control unit 21 at a step S31, control goes to a step S32, whereat the control unit 4 stores data indicating that the present available mode is the standard mode in its internal memory. Then, control goes to a step S33, whereat the sub image synthesizing unit 7 is set to the unavailable state and control is ended.

Figure 9:
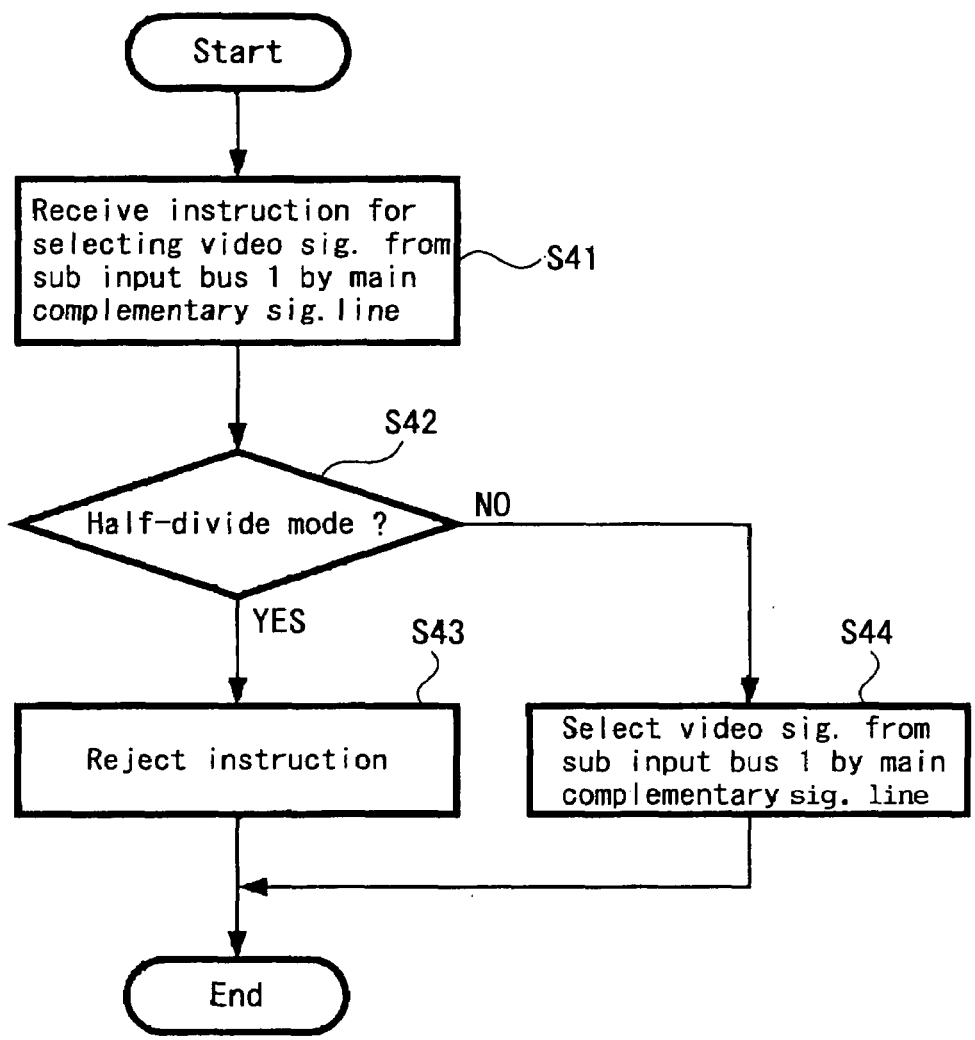
FIG. 9 is a flowchart to which reference will be made in explaining processing executed by the control unit within the switcher body when the control unit receives instruction to select a video signal from a common input bus by a main complementary signal line during wipe border.

FIG. 9 is a flowchart to which reference will be made in explaining processing executed by the control unit 4 within the switcher body 1 when it receives instruction to select the video signal from the input bus 5d (sub input bus 1 serving as the common input bus) by the main complementary signal line 9c of the synthesis selecting unit 9 from the control unit 21 within the control panel 2 during the wipe border shown in FIG. 3C is being performed on the video signal by the main image synthesizing unit 6. Referring to FIG. 9 and following the start of operation, when the control unit 4 receives this instruction from the control unit 21 at a step S41, control goes to the next decision step S42, whereat it is determined whether or not the present available mode (mode stored at the step S22 in FIG. 7 and mode stored at the step S32 in FIG. 8) is the half-divide mode.

If a YES is outputted at the decision step S42, then control goes to a step S43, whereat this instruction is not allowed and then control is ended as it is. If on the other hand a NO is outputted at the decision step S42 (if the present available mode is the standard mode), then control goes to a step S44, whereat the video signal from the input bus 5d is selected by the main complementary signal line 9c and then control is ended.

Figure 10:
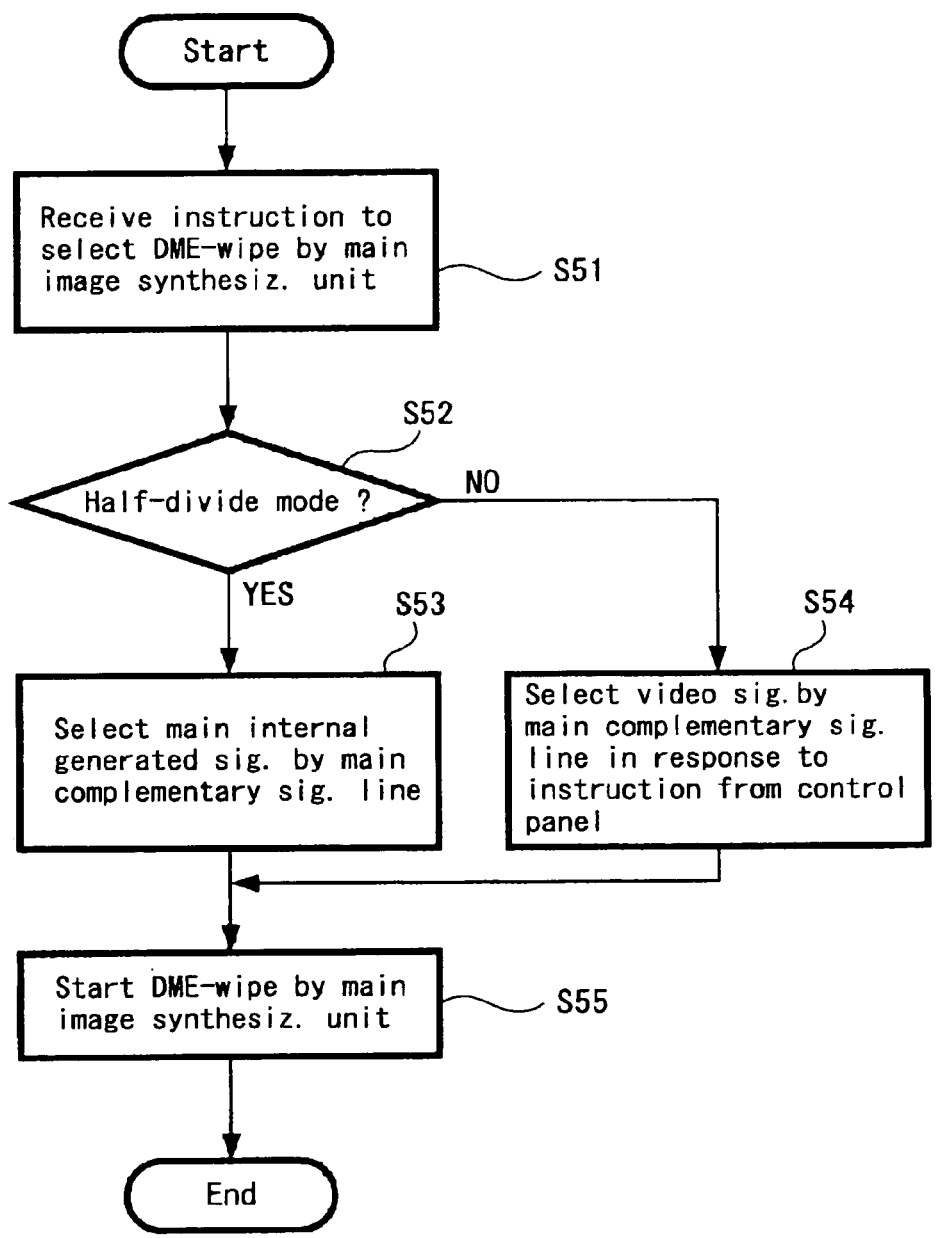
FIG. 10 is a flowchart to which reference will be made in explaining processing executed by the control unit within the switcher body when the control unit receives DME-wipe instruction.

FIG. 10 is a flowchart to which reference will be made in explaining processing executed by the control unit 4 within the switcher body 1 when it receives instruction to select the DME-wipe shown in FIG. 3C as the kind of effect performed on the video signal by the main image synthesizing unit 6 from the control unit 21 within the control panel 2. Referring to FIG. 10 and following the start of operation, when the control unit 4 receives this instruction from the control unit 21 at a step S51, then control goes to the next decision step S52, whereat it is determined whether or not the present available mode is the half-divide mode.

If a YES is outputted at the decision step S52, then control goes to a step S53, whereat the main internal generated signal from the internal signal generator 8 is selected by the main complementary signal line 9c of the synthesis selecting unit 9 regardless of instruction, indicating operations of the main complementary signal line 9c, received from the control unit 21 within the control panel 2. Then, control goes to a step S55, whereat the DME-wipe is started by the main image synthesizing unit 6 and then control is ended.

If on the other hand a NO is outputted at the decision step S52 (if the present available mode is the standard mode), then control goes to a step S54, whereat any of the video signal from the sub input bus 1 and the internal. generated signal is selected by the main complementary signal line 9c in response to instruction, indicating operations of the main complementary signal line 9c, received from the control unit 21 within the control panel 2. Then, control goes to the step S55.

Figure 11:
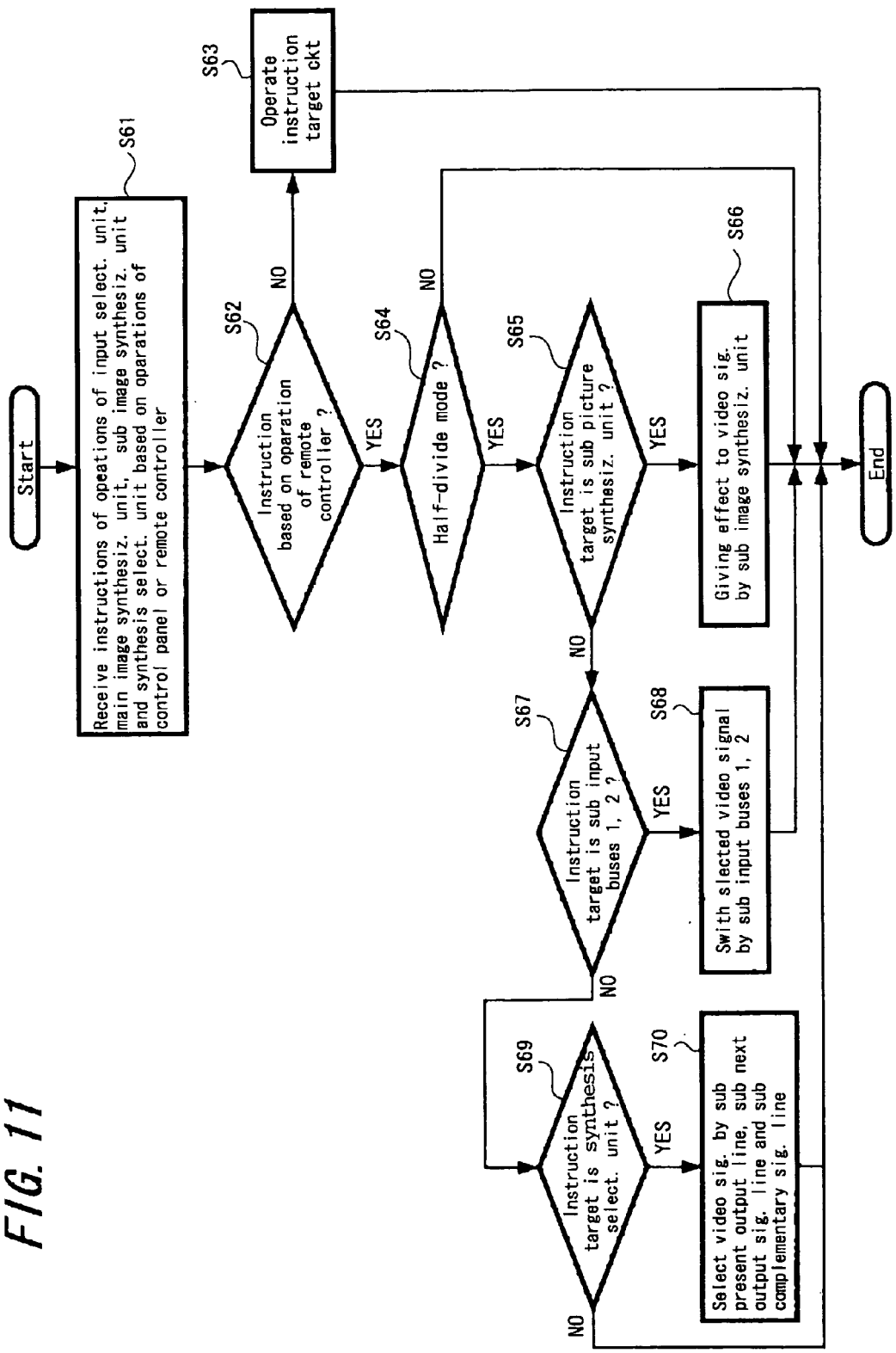
FIG. 11 is a flowchart to which reference will be made in explaining processing executed by the control unit within the switcher body when the control unit receives instruction to operate an input selecting unit, a main image synthesizing unit and as synthesis selecting unit 8.

FIG. 11 is a flowchart to which reference will be made in explaining processing executed by the control unit 4 within the switcher body 1 when it receives instruction indicating operations of the input selecting unit 5, the main image synthesizing unit 6 and the synthesis selecting unit 9 generated by operations of the operation input unit 22 within the control panel 2 (however, except the instructions shown in FIGS. 9 and 10) and instruction indicating operations of the input selecting unit 5, the sub image synthesizing unit 7 and the synthesis selecting unit 9 generated by operations of the remote controller 3 (instruction transferred by the control panel 2).

Referring to FIG. 11 and following the start of operation, when the control unit 21 receives any one of instructions at a step S61, then control goes to the next decision step S62, whereat it is determined whether or not the received instruction is instruction generated by operations of the remote controller 3.

If a NO is outputted at the decision step S62 (if the received instruction is instruction generated by operations of the operation input unit 22 of the control panel 2), then control goes to a step S63, whereat the instruction target circuits (input buses 5a, 5b, 5d (input bus 1, input bus 2 and sub input bus 1) or the main image synthesizing unit 6 or the main present output signal line 9a or the main next output signal line 9b) of the synthesis selecting unit 9 are energized. Then, control is ended.

If a YES is outputted at the decision step S62, then control goes to the next decision step S64, whereat it is determined whether or not the present available mode is the half-divide mode. If a NO is outputted at the decision step S64 (if the present available mode is the standard mode), then the circuits within the switcher body 1 are not energized and control is ended as it is. If on the other hand a YES is outputted at the decision step S64, then control goes to the next decision step S65, whereat it is determined whether or not the instruction target circuit is the sub image synthesizing unit 7.

If a YES is outputted at the decision step S65, then control goes to a step S66, whereat effect is performed on the video signal supplied from the synthesis selecting unit 9 to the sub image synthesizing unit 7 by the sub image synthesizing unit 7. Then, control is ended.

If a NO is outputted at the decision step S65, then control goes to the next decision step S67, whereat it is determined whether or not the instruction target circuit is the input selecting unit 5. If a YES is outputted at the decision step S67, then control goes to a step S68, whereat the video signal selected by the input buses 5$d$, 5$e$ (sub input bus 1 and sub input bus 2) of the input selecting unit 5 is switched in response to such instruction. Then, control is ended.

If a NO is outputted at the decision step S67, then control goes to the next decision step S69, whereat it is determined whether or not the instruction target circuit is the synthesis selecting unit 9. If a YES is outputted at the decision step S67, then control goes to a step S70, whereat video signals are selected by the sub present output signal line 9$d$, the sub next output signal line 9$e$ and the sub complementary signal line 9$f$ of the synthesis selecting unit 9 in response to such instruction. Then, control is ended. If on the other hand a NO is outputted at the decision step S67, then the circuits within the switcher body 1 are not energized and control is ended as it is.

Next, processing executed by the control unit 4 within the switcher body 1 when it receives instruction generated by operations of "recall button" (operation button for snapshot) of the operation input unit 22 from the control panel 2 will be described with reference to FIG. 12.

The control unit 4 within the switcher body 1 stores setting state information indicative of the setting state of the switcher body 1 at the operation time point (video signal of which line is selected by each input bus at the input selecting unit 5, effect of which kind is performed on the video signal by the sub image synthesizing unit 7, video signal of which input bus of the input selecting unit 5 is selected by each output line of the synthesis selecting unit 9, etc.) in its internal memory each time the "store button" of the operation input unit 22 is operated.

Figure 12:
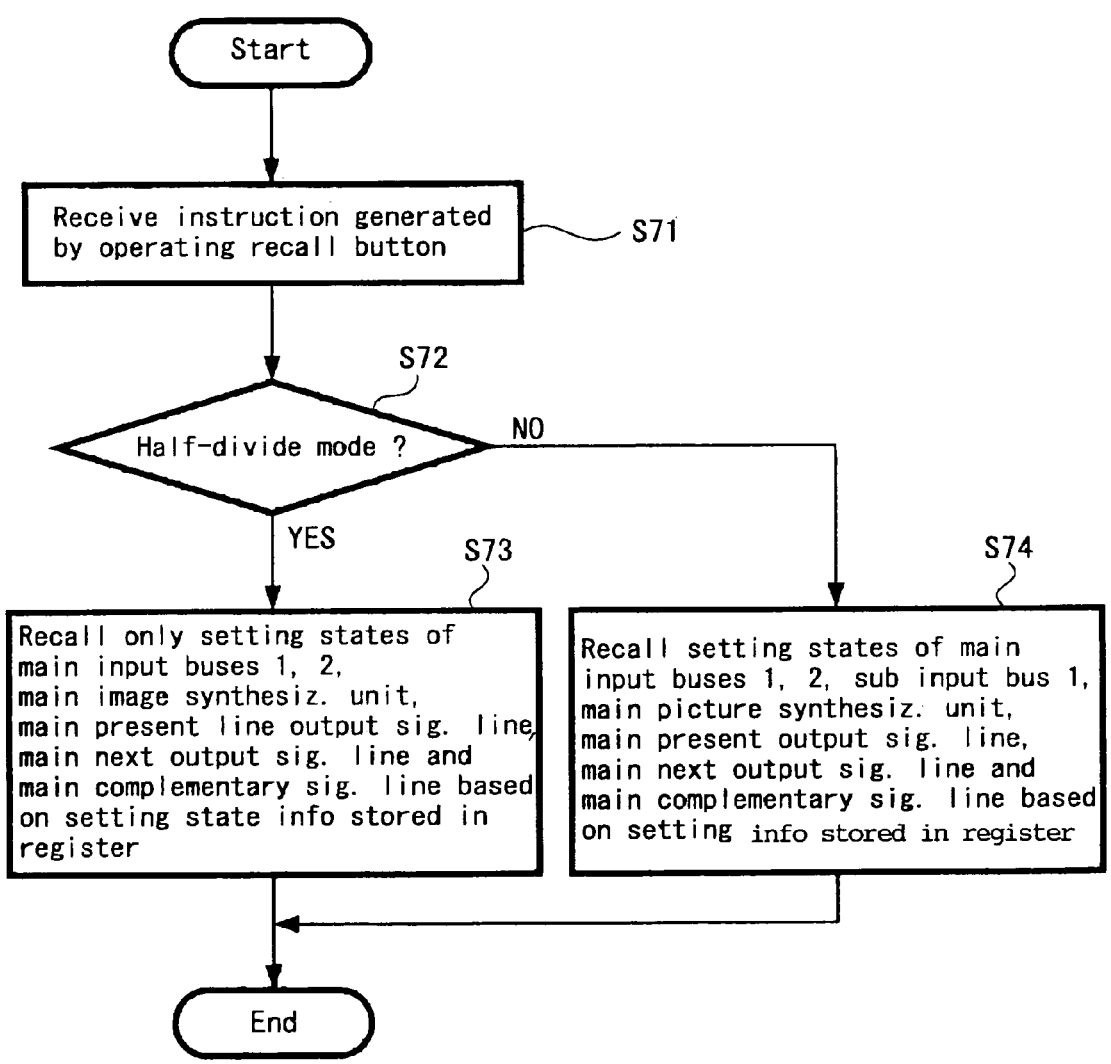
FIG. 12 is a flowchart to which reference will be made in explaining processing executed by the control unit within the switcher body when the control unit receives recall instruction.

Referring to FIG. 12 and following the start of operation, when the control unit 4 receives instruction generated by operations of the "store button" (operation button for snapshot) of the operation input unit 22 from the control panel 2 at a step S71, then control goes to the next decision step S72, whereat it is determined whether or not the present available mode is the half-divide mode. If a YES is outputted at the decision step S72, then control goes to a step S73, whereat only the setting states of the circuits exclusively provided in the control panel 2, such as the input buses 5$a$, 5$b$ (main input bus 1 and main input bus 2) of the input selecting unit 5, the main image synthesizing unit 6 and the main present output signal line 9$a$, the main next output signal line 9$b$ and the main complementary signal line 9$c$ of the synthesis selecting unit 9 are recalled to the setting states of the designated time point based on setting state information stored in the register. Then, control is ended. If on the other hand a NO is outputted at the decision step S72 (if the present available mode is the standard mode), then control goes to a step S74, whereat the input bus 5$d$ (sub input bus 1) also is recalled to the setting state of the designated time point in addition to the recall target circuits at the step S73. Then, control is ended.

Next, processing executed by the control unit 4 within the switcher body 1 in association with the bus toggle operation mode set by the operation input unit 22 of the control panel 2 and the "bus toggle setting button" of the remote controller 3 will be described with reference to FIG. 13.

When effects are performed on the video signal at the main image synthesizing unit 6 by the fader lever of the operation input unit 22 of the control panel 2 or effects are performed on the video signal at the sub image synthesizing unit 7 by the fader lever of the remote controller 3, the proceeding state in which the present video signal and the next video signal are replaced with each other as shown in FIGS. 3A to 3C is in proportion to the movement amount of the fader lever.

The control unit 21 within the control panel 2 transmits a fader value indicating the present movement amount of the fader lever to the control unit 4 within the switcher body 1 as instruction of the operations of this fader lever each time the movement amount of the fader lever is changed.

The control unit within the remote controller 3 also transmits a fader value indicative of the present movement amount of the fader lever to the control unit 21 within the control panel 2 each time the movement amount of this fader lever is changed (upon the half-divide mode, this fader value is transferred to the control unit 4 within the switcher body 1 by the processing shown in FIG. 6).

In the control unit 4 within the switcher body 1, the present video signal and the next video signal are synthesized by the main image synthesizing unit 6 and the sub image synthesizing unit 7 in response to this fader value. Then, when the fader value reaches the maximum value, that is, the fader lever is completely moved to the extreme end, as shown by the right end pictures on FIGS. 3A to 3C, the present video signal is completely replaced with the next video signal.

When the present video signal is completely replaced with the next video signal as described above, this time, the present video signal and the next video signal should be switched in such a manner that the corresponding next video signal which has been completely replaced may be used as a new present video signal. The following two methods are known as the methods of switching the present video signal and the next video signal.

(1): By the input selecting unit 5, the video signals selected by the main input bus 1 and the main input bus 2 are replaced with each other in such a manner that the video signals selected by the input bus 5$a$ (main input bus 1) and the input bus 5$b$ (main input bus 2) may be selected, this time, by the input bus 5$b$ (main input bus 2) and the input bus 5$a$ (main input bus 1). While the input buses 5$a$ and 5$b$ have been described so far, this relationship will apply for the input buses 5$d$ and 5$e$ (sub input buses 1 and 2) as well.

(2): By the synthesis selecting unit 9, the video signals selected by the main present output signal line 9$a$ and the main next output signal line 9$b$ are replaced with each other in such a manner that the video signals selected by the main present output signal line 9$a$ and the main next output signal line 9$b$ may be selected, this time, by the main next output signal line 9$b$ and the main present output signal line 9$a$. While the main present output signal line 9$a$ and the main next output signal line 9$b$ have been described so far, this relationship will apply for the sub present output signal line 9$d$ and the sub next output signal line 9$e$ as well.

According to the above-described method (1), the constantly same input bus of the main input bus 1 and the main input bus 2 becomes the input bus which selects the present video signal. Also, the constantly same input bus of the sub input bus 2 and the sub input bus 2 becomes the input bus which selects the present video signal.

According to the above-described method (2), the input buses of the main input bus 1 and the main input bus 2 and which select the present video signal are switched alternately. Also, the input buses of the sub input bus 1 and the sub input bus 2 and which select the present video signal are switched alternately.

The "bus toggle setting button" is an operation button which is used to arbitrarily select and set a suitable method of the above-described methods (1) and (2). When the bus toggle operation mode is set to the ON state, this means that the above-described method (1) may be selected. When on the other hand the bus toggle operation mode is set to the OFF state, this means that the above-described method (2) may be selected.

The control unit 2 within the control panel 2 transmits bus toggle operation mode information indicative of whether the present bus toggle operation mode is ON or OFF to the control unit 4 within the switcher body 1 each time the bus toggle operation mode setting done by the "bus toggle setting button" provided on the operation input unit 22 is changed.

The control unit within the remote controller 3 also transmits the bus toggle operation mode information indicative of whether the present bus toggle operation mode is ON or OFF to the control unit 21 within the control panel 2 each time the bus toggle operation mode setting done by the "bus toggle setting button" provided on the operation input unit of the remote controller 3 (upon the half-divide mode, this information is transferred to the control unit 4 within the switcher main body 1 by the processing shown in FIG. 6).

The control unit 4 within the switcher body 1 stores bus toggle operation mode information transmitted from the control panel 2 and the latest bus toggle operation mode information transmitted (transferred by the control panel 2) from the remote controller 3 in its internal memories, respectively.

Figure 13:
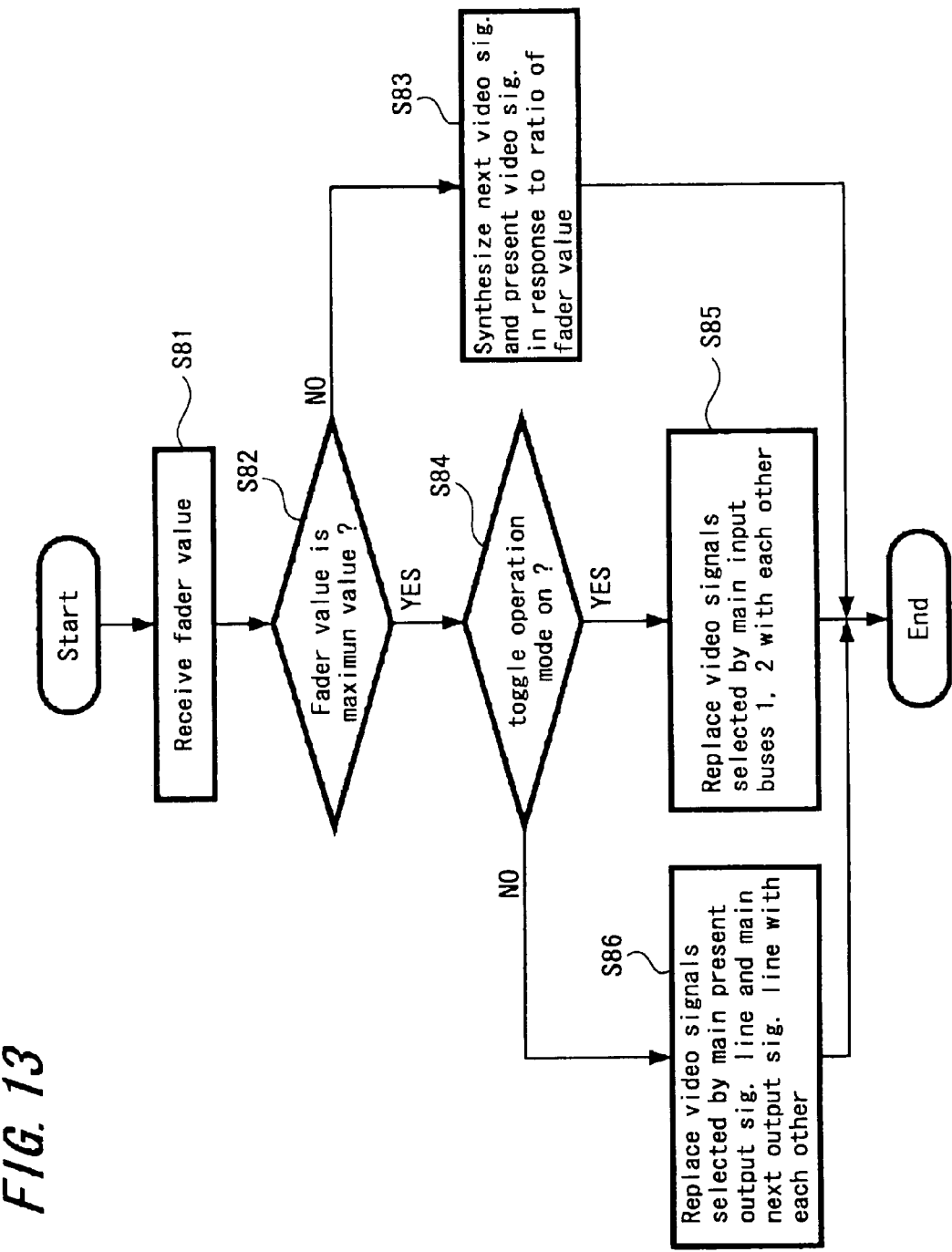
FIG. 13 is a flowchart to which reference will be made in explaining processing executed by the control unit within the switcher body when the control unit receives a fader value obtained when a fader lever on the control panel is operated.

Each time the control unit 4 within the switcher body 1 receives the fader value obtained by operations of the fader lever of the operation input unit 22 of the control panel 2, the control unit 4 executes the processing shown in FIG. 13.

Referring to FIG. 13 and following the start of operation, when the control unit 4 receives the fader value obtained by operations of the fader lever of the operation input unit 22*a* t a step S81, then control goes to the next decision step S82, whereat it is determined whether or not the thus received fader value is the maximum value (it is determined whether or not the fader lever is completely moved to the extreme end).

If a NO is outputted at the decision step S82, then control goes to a step S83, whereat the present video signal and the next video signal are synthesized by the main image synthesizing unit 6. Then, control is ended.

If a YES is outputted at the decision step S82, then control goes to the next decision step S84, whereat it is determined based on the latest bus toggle operation mode information transmitted from the control panel 2 and which is stored in the internal memory whether or not the present bus toggle operation mode is ON.

If a YES is outputted at the decision step S84, then control goes to a step S85, whereat the video signals selected by the input bus 5*a* (main input bus 1) and the input bus 5*b* (main input bus 2) of the input selecting unit 5 are replaced with each other as was described in the above-described method (1). Then, control is ended.

If a NO is outputted at the decision step S84, then control goes to a step S86, whereat the video signals selected by the main present output signal line 9*a* and the main next output signal line 9*b* of the synthesis selecting unit 9 are replaced with each other as was described in the above-described method (2). Then, control is ended.

When the control unit 4 receives the fader value obtained by operations of the fader lever of the remote controller 3, the control unit 4 within the switcher body 1 replaces the control target at the portion of the step S83 with the sub image synthesizing unit 7, replaces the judgment target at the portion of the step S84 with the bus toggle operation mode information from the remote controller 3, replaces the control target at the portion of the step S85 with the input buses 5*d* and 5*e* (sub input buses 1 and 2) and replaces the control target at the portion of the step S86 with the sub present output signal line 9*d* and the sub next output signal line 9*e* and thereby it execute processing similar to that shown in FIG. 13.

Next, the manner in which the switcher body 1 is operated by the control panel 2 and the remote controller 3 in this image switching apparatus will be described.

When the operator who operates the control panel 2 sets the available mode of the switcher body 1 to the standard mode by using the "available mode setting button" on the operation input unit 22, although the control unit 21 of the control panel 2 transmits instruction obtained by operations of the operation input unit 22 to the control unit 4 within the switcher body 1, the control unit 21 does not transfer instruction from the remote controller 3 to the control unit 4 (step S14 in FIG. 6).

Then, the control unit 4 controls the input buses 5*a*, 5*b*, 5*d* (main input bus 1, main input bus 2 and sub input bus 1) of the input selecting unit 5, the main image synthesizing unit 6 and the main present output signal line 9*a*, the main next output signal line 9*b* and the main complementary signal line 9*c* of the synthesis selecting unit 9 in response to the instruction from the control panel 2 (see the step S63 in FIG. 11 and the step S44 shown in FIG. 9 and the step S54 shown in FIG. 10 with respect to the main complementary signal line 9*c*).

Accordingly, the video signals can be selected by the main input bus 1, the main input bus 2 and the sub input bus 1 (common input bus) under control of the control panel 2, the video signal selected by the sub input bus 1 can be selected by the main complementary signal line 9*c* and effects can be performed on the above video signal by the main image synthesizing unit 6. Therefore, the effects such as the wipe border shown in FIG. 3B and the DME-wipe shown in FIG. 3C can be performed on the video signals selected by the main input bus 1 and the main input bus 2 by using the video signal selected with the sub input bus 1 as the wipe border fill and the background signal. Then, the video signal on which the effects were perform as described above is outputted from the output terminal 11*a* of the switcher body 1.

On the other hand, when the available mode of the switcher body 1 is set to the half-divide mode by the "available mode setting button" of the operation input unit 22, the control panel 2 transmits instruction obtained by operations of the operation input unit 22 to the control unit 4 within the switcher body 1 and the control panel 2 also transfers instruction from the remote controller 3 to the control unit 4 (step S13 shown in FIG. 6).

Then, the control unit 4 controls the input selecting unit 5, the main image synthesizing unit 6 and the synthesis selecting unit 9 in response to the instruction from the control panel 2 (step S63 shown in FIG. 11). Also, the control unit 4 controls the input buses 5*d*, 5*e* (sub input bus 1 and sub input bus 2) of the input selecting unit 5, the sub image synthesizing unit 7 and the sub present output signal line 9*d*, the sub next output signal line 9*e* and the sub complementary signal line 9*f* of the synthesis selecting unit 9 in response to the instruction from the remote controller 3 (steps S65 to S70 shown in FIG. 11).

Accordingly, at the same time the control panel 2 selects the video signals by the main input bus 1 and the main input bus 2 and effects are performed on these video signals by the main image synthesizing unit 6, another operator of the remote controller 3 can select the video signals by using the sub input bus 1 and the sub input bus 2 and effects can be performed on these video signals by the sub image synthesizing unit 7. Then, at the same time the video signal on which effects were performed by the main image synthesizing unit 6 can be outputted from the output terminal 11, the video signal on which effects were performed by the sub image synthesizing unit 7 can be outputted from the output terminal 11b.

In this manner, the sub input bus 1 which is the circuit within one input selecting unit 5 of the same switcher body 1 can be commonly used for the purpose of generating a video signal of one channel by only the control panel 2 and for the purpose of generating video signals of two channels in total by the control panel 2 and the remote controller 3.

As a result, not only the image switching apparatus can be used in a variety of purposes but also the image switching apparatus can be composed of lesser circuits and it can be usefully used without waste as their circuits are changed.

Then, when the operation for operating the sub input bus 1 serving as the common input bus is carried out at the operation input unit 22 upon the half-divide mode, the control unit 21 of the control panel 2 does not transmit instruction to operate the sub input bus 1 to the control unit 4 within the switcher body 1 (step S4 shown in FIG. 5). Accordingly, upon the half-divide mode, the sub input bus 1 is not energized by the operations of the control panel 2.

Consequently, it is possible to prevent the sub input bus 1 from mal-functioning by the operations of the control panel 2 in the half-divide mode in which the sub input bus 1 is operated by the operations of the remote controller 3.

In the standard mode, any of the video signal selected by the sub input bus 1 and the main internal generated signal from the internal signal generator 8 can be selected by operating the control panel 2 and they can be used as the wipe border and the background signal required when the wipe border and the DME-wipe are performed on the video signals by the main image synthesizing unit 6. However, in the half-divide mode, only the main internal generated signal from the internal signal generator 8 can be used as the wipe border fill and the background signal (step S23 shown in FIG. 7, step S43 shown in FIG. 9 and step S53 shown in FIG. 10).

As a consequence, it is possible to prevent the video signal which is not intended by the operator who operates the control panel 2 (video signal selected by another operator who operates the remote controller 3) from being used as the wipe border fill and the background signal upon the half-divide mode.

Also, when the switcher body 1 is recalled to the setting state of the past time point by using the "store button" (operation button for snapshot) of the operation input unit 22 of the control panel 2, upon the half-divide mode, only the circuits exclusively provided for the control panel 2, such as the input buses 5a, 5b (main input bus 1 and main input bus 2) of the synthesis selecting unit 5, the main image synthesizing unit and the main present output signal line 9a, the main next output signal line 9b and the main complementary signal line 9c of the synthesis selecting unit 9 can be recalled (step S73 shown in FIG. 12). Accordingly, since the setting states of the input buses 5d, 5e (sub input bus 1 and sub input bus 2) of the input selecting unit 5 serving as the circuit used by the remote controller 3, the sub image synthesizing unit 7 and the sub present output signal line 9d, the sub next output signal line 9e and the sub complementary signal line 9f of the synthesis selecting unit 9 are not recalled, these circuits can be maintained in the present setting states.

Thus, it is possible to prevent the setting states of the sub input bus 1, the sub input bus 2, the sub image synthesizing unit 7, the sub present output signal line 9d, the sub next output signal line 9e and the sub complementary signal line 9f from being recalled against the intention of the operator who operates the remote controller 3.

The bus toggle operation mode setting (setting to switch the present video signal and the next video signal by either of the input selecting unit 5 and the synthesis selecting unit 9 when the fader lever is moved to the extreme end) can be carried out by the "bus toggle setting button" of the operation input unit 22 of the control panel 2 and the "bus toggle setting button" of the operation input unit of the remote controller 3.

Then, depending on the bus toggle operation mode set by the control panel 2, only the main input bus 1, the main input bus 2, the main present output signal line 9a and the main next output signal line 9b can be controlled (steps S84 to S86 shown in FIG. 13). Further, depending on the bus toggle operation mode set by the remote controller 3, only the sub input bus 1, the sub input bus 2, the sub present output signal line 9d and the sub next output signal line 9e can be controlled.

Accordingly, it is possible to prevent the operator of the remote controller 3 from becoming unable to understand which of the sub input bus 1 and the sub input bus 2 selects the present video signal by the operations of the operator of the control panel 2 upon the half-divide mode. Similarly, it is possible to prevent the operator of the control panel 2 from becoming unable to understand which of the main input bus 1 and the main input bus 2 selects the present video signal by the operations of the operator of the remote controller 3. Thus, it is possible to improve both of operability of the control panel 2 and operability of the remote controller 3 in the half-divide mode.

The control panel 2 does not transmit instruction corresponding to the operation to the switcher body 1 when the operation to operate the sub input bus 1 is executed by the operation input unit 22 upon the half-divide mode as shown in FIG. 5. Alternatively, when the operation to operate the sub input bus 1 is executed by the operation input unit 22 in the half-divide mode, the instruction corresponding to such operation may be transmitted to the switcher body 1 and this instruction may be ignored by the control unit 4 within the switcher body 1 upon the half-divide mode (depending on the instruction from the control panel 2, the sub input bus 1 may not be operated and the sub input bus 1 may be operated in response to only the instruction from the remote controller 3).

In the above-mentioned embodiments, as shown in FIG. 6, upon the standard mode, the control panel 2 does not transfer the instruction from the remote controller 3 to the switcher body 1 and the control panel 2 discards such instruction. Alternatively, also in the standard mode, the control panel 2 may transmit the instruction from the remote controller 3 to the switcher body 1 and the control unit 4 within the switcher body 1 may ignore the instruction from the remote controller 3 upon the standard mode (depending on instruction from the remote controller 3, the circuits within the switcher body 3 may be inhibited from being energized).

Further, in the above-mentioned embodiments, both of the control panel 2 and the remote controller 3 are provided with the fader levers and the "bus toggle setting buttons". Alternatively, the remote controller 3 may not be provided with the fader lever and the "bus toggle setting button" but the remote controller 3 may be provided with an operation button to automatically change at a constant speed a ratio in which the present video signal and the next video signal are synthesized when effects are performed on the video signals.

As a result, the remote controller 3 can be made smaller in size. Also, even in such a case, since only the main input bus 1, the main input bus 2, the main present output signal line 9a and the main next output signal line 9b are controlled depending on the bus toggle operation mode set by the control panel 2 (steps S84 to S86 shown in FIG. 13), it is possible to prevent the operator of the remote controller 3 from becoming unable to understand which input bus of the sub input bus 1 and the sub input bus 2 selects the present video signal due to the operations of the operator of the control panel 2.

While only the sub input bus 1 is used as the common input bus which is made common to the control panel 2 in the above-mentioned embodiments, the present invention is not limited thereto and both of the sub input bus 1 and the sub input bus 2 may be used as the common input bus.

While the numbers of the input buses and the video signal input lines of the input selecting unit 5 shown in FIG. 2 are determined for convenience sake by way of example and they may be changed freely. Thus, it is needless to say that the present invention can be applied to an image switching apparatus including input buses and video signal input lines of different numbers.

According to the first image switching apparatus of the present invention and the method of controlling the image processing unit of the image switching apparatus of the present invention, not only the image switching apparatus can be used in a variety of purposes but also the image switching apparatus can be composed of lesser circuits and such circuits can be separately used without waste as their uses are changed.

According to the second image switching apparatus of the present invention, when another operation apparatus is newly connected to the image switching apparatus, effects similar to those of the first image switching apparatus can be achieved. Further, there can be achieved the effect in which the common circuit can be prevented from mal-functioning in the half-divide mode.

According to the third switching apparatus of the present invention, when another operation apparatus is newly connected to the image switching apparatus, effects similar to those of the first image switching apparatus can be achieved. Further, when wipe effect in which another third video signal is interposed between the present video signal and the next video signal is performed on the video signal, there can be achieved the effect in which the video signal which the operator does not intend to generate can be prevented from being used as the third video signal.

According to the fourth image switching apparatus of the present invention, when another operation apparatus is newly connected to the image switching apparatus, effects similar to those of the first image switching apparatus can be achieved. Further, there can be achieved the effect in which the sub circuit block can be prevented from being recalled to the setting state of the past time point against the intention of the operator who operates another operation apparatus.

According to the fifth image switching apparatus of the present invention, when another operation apparatus is newly connected to the image switching apparatus, effects similar to those of the first image switching apparatus can be achieved. Further, it is possible to prevent the operator operating another operation apparatus from becoming unable to understand which input bus of the sub input buses selects the present video signal and hence there can be achieved the effect in which operability of another operation apparatus can be improved.

It should be understood by those skilled in the art that various modifications, combinations, sub-combinations and alterations may occur depending on design requirements and other factors insofar as they are within the scope of the appended claims or the equivalents thereof.

What is claimed is:

1. An image switching apparatus comprising:
an image processing unit for switching and outputting a video signal from inputted video signals of a plurality of channels and performing effects on a video signal upon switching;
a control unit for controlling said image processing unit;
a main operation unit connected to said control unit through a communication channel and which is used to operate said image processing unit; and
a sub operation unit which can be connected to said main operation unit through a communication channel to operate said image processing unit, wherein said image processing unit includes a main circuit block exclusively provided in said main operation unit and a sub circuit block for use with said sub operation unit, at least a part of a circuit of said sub circuit block being a common circuit made common to said main operation unit, said image processing unit includes mode setting means for setting the available mode of said image processing unit to the standard mode or the half-divide mode, said main operation unit does not transfer instruction from said sub operation unit to said control unit upon said standard mode, said main operation unit transfers instruction from said sub operation unit to said control unit upon said half-divide mode, said control unit controls said image processing unit in response to instruction from said main operation unit upon said standard mode and said control unit controls said image processing unit in response to instruction from said main operation unit and also controls said sub circuit block in response to instruction transferred to said sub operation unit from said main operation unit upon said half-divide mode.

2. An image switching apparatus according to claim 1, wherein said image processing unit includes an input selecting unit for selecting each video signal from inputted video signals of a plurality of channels through a plurality of input buses and an image synthesizing unit for performing effects on the video signal selected by said input selecting unit and said input selecting unit includes more than two input buses serving as main input buses constructing said main circuit block, more than remaining two input buses serving as sub input buses constructing said sub circuit block and more than one input bus of said sub input buses constructing said common circuit.

3. An image switching apparatus according to claim 1, wherein said image synthesizing unit includes a main image synthesizing unit for performing effects on video signals selected by said main input bus and said common input bus and a sub image synthesizing unit for performing effects on the video signal selected by said sub input bus, said control unit controls said main image synthesizing unit in response to instruction from said main operation unit upon said standard mode, said control unit controls said main image synthesizing unit in response to instruction from said main operation unit upon said half-divide mode and said control unit controls said sub image synthesizing unit in response to instruction from said sub operation unit transferred from said main operation unit.

4. An image switching apparatus according to claim 1, wherein said mode setting means is an operation means provided in said main operation unit, information indicative of said available mode set by said operation means being transmitted from said main operation unit to said control unit.

5. An image switching apparatus according to claim 1, wherein said main operation unit does not transmit instruction to energize said common circuit when operation for energizing said common circuit is made upon said half-divide mode.

6. An image switching apparatus according to claim 3, wherein said image processing unit further includes an internal signal generator for generating a video signal in the inside of said image processing unit, said main image synthesizing unit has a function to interpose a third video signal between a present video signal and the next video signal, said control unit supplies either the video signal selected by said common input bus or the video signal from said internal signal generator to said main image synthesizing unit as said third video signal in response to instruction from said main operation unit upon said standard mode and said control unit supplies only the video signal from said internal signal generator to said main image synthesizing unit as said third video signal upon said half-divide mode.

7. An image switching apparatus according to claim 1, wherein said control unit stores therein setting state information indicative of the setting state in which said image processing unit was set at the past time point, said main operation unit includes operation means for recalling said image processing unit to the setting state in which said image processing unit was set at said past time point and said control unit recalls only the setting state of said main circuit block to the setting state obtained at said past time point based on said setting state information in response to instruction supplied from said main operation unit when said operation means is operated upon said half-divide mode.

8. An image switching apparatus according to claim 3, wherein said image processing unit further includes a synthesis selecting unit for selecting two video signals selected by said main input bus such that either of said two video signals is supplied to said main image synthesizing unit as the present video signal and the next video signal and selecting two video signals selected by said sub input bus such that either of said two video signals is supplied to said sub image synthesizing unit as the present video signal and the next video signal, said control unit has a function to select by controlling either of said main input bus and said synthesis selecting unit whether or not processing for switching the present video signal and the next video signal is executed when the present video signal is completely replaced with the next video signal by said main image synthesizing unit and a function to select by controlling either of said sub input bus and said synthesis selecting unit whether or not processing for switching the present video signal and the next vide signal is executed when the present video signal is completely replaced with the next video signal by said sub image synthesizing unit, said main operation unit includes an operation means for selecting whether processing for switching the present video signal and the next video signal is executed by said input selecting unit or said synthesis selecting unit when the present video signal is completely replaced with the next video signal by said main image synthesizing unit and said control unit allows either said input selecting unit to control only said main input bus or said synthesis selecting unit to select only the video signal supplied to said main image synthesizing unit in response to instruction supplied from said main operation unit when said operation means is operated.

9. An image switching apparatus comprising:
an image processing unit for switching and outputting a video signal from inputted video signals of a plurality of channels and performing effects on a video signal upon switching;
a control unit for controlling said image processing unit; and
an operation unit connected to said control unit through a communication channel and which is used to operate said image processing unit, wherein said image processing unit includes a main circuit block exclusively provided in said operation unit and a sub circuit block provided independently of said main circuit block, at least a part of a circuit of said sub circuit block being a common circuit made common to said operation unit, said image processing unit includes mode setting means for setting the available mode of said image processing unit to the standard mode or the half-divide mode, said operation unit does not transfer instruction for energizing said common circuit to said control circuit when operation for energizing said common circuit is made upon said half-divide mode.

10. An image switching apparatus comprising:
an image processing unit for switching and outputting a video signal from inputted video signals of a plurality of channels and performing effects on a video signal upon switching;
a control unit for controlling said image processing unit; and
an operation unit connected to said control unit through a communication channel and which is used to operate said image processing unit, wherein said image processing unit includes an input selecting unit for selecting each video signal from inputted video signals of a plurality of channels through a plurality of input buses, an image synthesizing unit for performing effects on the video signal selected by said input selecting unit and an internal signal generator for generating a video signal in the inside of said image processing unit and said input selecting unit includes more than two main input buses exclusively used for said operation unit and more than two sub input buses provided independently of said main input buses, at least more than one input bus of said sub input buses is a common input bus made common to said operation unit, said image synthesizing unit, has a function to interpose a third video signal between the present video signal and the next video signal when effects are performed on a video signal, said image processing unit includes mode setting means for setting the available mode of said image processing unit to the standard mode or the half-divide mode and said control unit supplies either of the video signal selected by said common input bus and the video signal from said internal signal generator to said image synthesizing unit as a third video signal in response to instruction from said operation unit upon said standard mode and said control unit supplies only the video signal from said internal signal generator to said image synthesizing unit as said third video signal upon said half-divide mode.

11. An image switching apparatus
an image processing unit for switching and outputting a video signal from inputted video signals of a plurality of channels and performing effects on a video signal upon switching;
a control unit for controlling said image processing unit; and
an operation unit connected to said control unit through a communication channel and which is used to operate said image processing unit, wherein said image processing unit includes a main circuit block exclusively provided in said operation unit and a sub circuit block provided independently of said main circuit block, at least a part of a circuit of said sub circuit block being a common circuit made common to said operation unit, said image processing unit includes mode setting means for setting the available mode of said image processing unit to the standard mode or the half-divide mode, said control unit stores therein setting state information indicative of the setting state in which said image processing unit was set at the past time point, said operation unit includes operation means for recalling said image processing unit to the setting state in which said image processing unit was set at said past time point and said control unit recalls only the setting state of said main circuit block to the setting state obtained at said past time point based on said setting state information in response to instruction supplied from said operation unit when said operation means is operated upon said half-divide mode.

12. An image switching apparatus comprising:

an image processing unit for switching and outputting a video signal from inputted video signals of a plurality of channels and performing effects on a video signal upon switching;

a control unit for controlling said image processing unit; and an operation unit connected to said control unit through a communication channel and which is used to operate said image processing unit, wherein said image processing unit includes an input selecting unit for selecting each video signal from inputted video signals of a plurality of channels through a plurality of input buses, an image synthesizing unit for performing effects on the video signal selected by said input selecting unit and a synthesis selecting unit for selecting two video signals selected by said input selecting unit such that either of said two video signals is supplied to said image synthesizing unit as the present video signal and the next video signal, said input selecting unit includes more than two main input buses exclusively provided in said operation unit and ore than two sub input buses provided independently of said main input bus, at least more than one input bus of said sub input buses being a common input bus made common to said operation unit, said image synthesizing unit includes a main image synthesizing unit for performing effects on the video signals selected by said main input bus and said common input bus and a sub image synthesizing unit for performing effects on the video signal selected by said sub input bus, said image processing unit includes mode setting means for setting the available mode of said image processing unit to the standard mode or the half-divide mode, said control unit has a function to select by controlling either of said main input bus and said synthesis selecting unit whether or not processing for switching the present video signal and the next video signal is executed when the present video signal is completely replaced with the next video signal by said main image synthesizing unit and a function to select by controlling either of said sub input bus and said synthesis selecting unit whether or not processing for switching the present video signal and the next vide signal is executed when the present video signal is completely replaced with the next video signal by said sub image synthesizing unit, said operation unit includes an operation means for selecting whether processing for switching the present video signal and the next video signal is executed by said input selecting unit or said synthesis selecting unit when the present video signal is completely replaced with the next video signal by said image synthesizing unit and said control unit allows either said input selecting unit to control only said main input bus or said synthesis selecting unit to select only the video signal supplied to said main image synthesizing unit in response to instruction supplied from said operation unit when said operation means is operated.

13. A method of controlling an image processing unit of said image switching apparatus an image switching apparatus, said image switching apparatus composed of:

an image processing unit for switching and outputting a video signal from inputted video signals of a plurality of channels and performing effects on a video signal upon switching;

a control unit for controlling said image processing unit; and a main operation unit connected to said control unit through a communication channel and which is used to operate said image processing unit and a sub operation unit which can be connected to said main operation unit through a communication channel to operate said image processing unit, wherein said image processing unit includes a main circuit block exclusively provided in said main operation unit, and a sub circuit block for use with said sub operation unit, at least a part of a circuit of said sub circuit block being a common circuit made common to said main operation unit, said control method comprising the steps of:

a step for setting the available mode of said image processing unit to the standard mode or the half-divide mode;

a step for inhibiting said main operation unit from transferring instruction from said sub operation unit to said control unit upon said standard mode and transferring instruction from said sub operation unit to said control unit upon said half-divide mode;

a step for allowing said control unit to control said image processing unit in response to instruction from said main operation unit upon said standard mode, allowing said control unit to control said image processing unit in response to instruction from said main operation unit and allowing said control unit to control said sub circuit block in response to instruction transferred from said sub operation unit by said main operation unit upon said half-divide mode.

* * * * *